United States Patent
Mitsumori

(10) Patent No.: US 7,619,987 B2
(45) Date of Patent: Nov. 17, 2009

(54) NODE DEVICE

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 11/045,063

(22) Filed: Jan. 31, 2005

(65) Prior Publication Data

US 2006/0092856 A1 May 4, 2006

(30) Foreign Application Priority Data

Oct. 28, 2004 (JP) .............................. 2004-314580

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl. ................. 370/254; 370/216; 370/224; 370/401; 709/232

(58) Field of Classification Search ......... 370/216–258, 370/392–469; 709/221–251
See application file for complete search history.

(56) References Cited

U.S. PATENT DOCUMENTS

| | | | | |
|---|---|---|---|---|
| 5,864,677 A * | 1/1999 | Van Loo | ...................... | 709/232 |
| 6,463,472 B1 * | 10/2002 | Van Loo | ...................... | 709/224 |
| 6,751,189 B1 * | 6/2004 | Gullicksen et al. | .......... | 370/216 |
| 7,046,621 B2 * | 5/2006 | Wang et al. | .................. | 370/222 |
| 7,167,445 B2 * | 1/2007 | Gullicksen et al. | .......... | 370/224 |
| 7,173,913 B2 * | 2/2007 | Sato | ........................... | 370/256 |
| 7,292,535 B2 * | 11/2007 | Folkes et al. | ................. | 370/238 |
| 7,307,947 B2 * | 12/2007 | Okuno | ........................ | 370/222 |
| 7,324,440 B2 * | 1/2008 | Takagi et al. | ................. | 370/222 |
| 2004/0103179 A1 * | 5/2004 | Damm et al. | ............... | 709/223 |
| 2004/0198372 A1 * | 10/2004 | Auterinen | .................... | 455/453 |
| 2004/0264364 A1 * | 12/2004 | Sato | ........................... | 370/217 |
| 2005/0083953 A1 * | 4/2005 | May | ........................... | 370/401 |
| 2005/0135233 A1 * | 6/2005 | May | ........................... | 370/216 |
| 2005/0249233 A1 * | 11/2005 | Akaba et al. | ................. | 370/432 |
| 2006/0120279 A1 * | 6/2006 | Mitsumori | .................. | 370/218 |
| 2007/0081535 A1 * | 4/2007 | Li | ............................... | 370/392 |

FOREIGN PATENT DOCUMENTS

JP 1-101047 4/1989
JP 2004-179880 6/2004

* cited by examiner

*Primary Examiner*—M. Phan
(74) *Attorney, Agent, or Firm*—Staas & Halsey LLP

(57) ABSTRACT

In node devices composing a ring network connected to another network with a redundant node device, a topology table includes redundancy information of the redundant node device, a transmitter transmits topology information and the redundancy information of the node devices themselves, a topology table preparing portion prepares a topology table based on redundancy information and topology information received from the redundant node device, and topology information received from the other node device, and a packet distributor distributes a packet received over the ring network based on the topology table.

35 Claims, 21 Drawing Sheets

FIG.5A

| STATE | OPERATION |
|---|---|
| INITIAL STATE ST10, ST20 | REDUNDANT ROUTE & RING ROUTE ARE IN BLOCKING STATE TRANSMIT KEEP ALIVE MESSAGE OF "REDUNDANT STATE = INITIAL STATE" |
| WORKING STATE ST11, ST21 | REDUNDANT ROUTE & RING ROUTE ARE IN FORWARDING STATE TRANSMIT KEEP ALIVE MESSAGE OF "REDUNDANT STATE = WORKING STATE" |
| PROTECTION STATE ST12, ST22 | REDUNDANT ROUTE & RING ROUTE ARE IN BLOCKING STATE TRANSMIT KEEP ALIVE MESSAGE OF "REDUNDANT STATE = PROTECTION STATE" |

FIG.5B

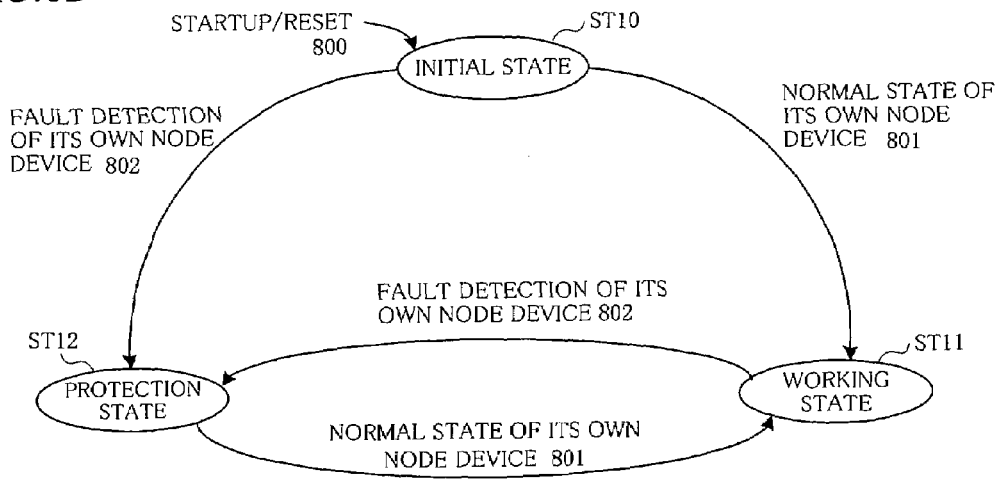

FIG.5C

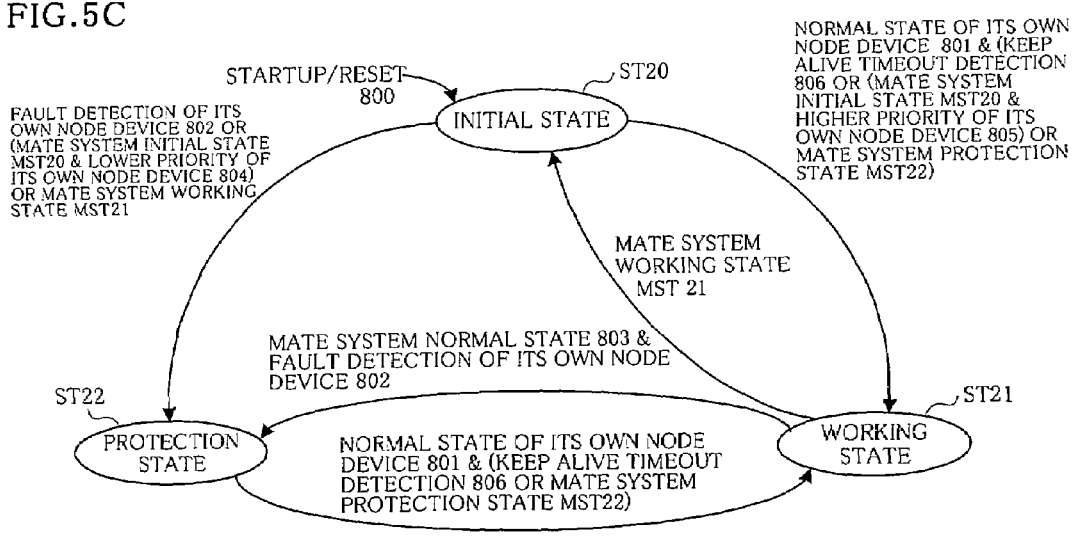

| NODE DEVICE ADDRESS | REDUNDANT NODE DEVICE ENABLE | REDUNDANCY TYPE | EAST HOP NUMBER | WEST HOP NUMBER | EAST ROUTE SELECTION | WEST ROUTE SELECTION |
|---|---|---|---|---|---|---|
| 100_11 | OFF | 0 | 0 | 0 | OFF | OFF |
| 100_12 | OFF | 0 | 1 | 5 | ON | OFF |
| 100z_13 | ON | 1 | 2 | 4 | ON | OFF |
| 100_14 | OFF | 0 | 3 | 3 | ON | OFF |
| 100z_15 | ON | 1 | 4 | 2 | OFF | ON |
| 100_16 | OFF | 0 | 5 | 1 | OFF | ON |
| 100z1 | – | 0 | 6 | 6 | ON | OFF |

70t

| | NODE DEVICE ADDRESS | REDUNDANT NODE DEVICE ENABLE | REDUNDANCY TYPE | EAST HOP NUMBER | WEST HOP NUMBER | EAST ROUTE SELECTION | WEST ROUTE SELECTION |
|---|---|---|---|---|---|---|---|
| 70u | 100_11 | OFF | 0 | 0 | 0 | OFF | OFF |
| | 100_12 | OFF | 0 | 1 | 5 | ON | OFF |
| | 100z_13 | ON | 1 | 2 | 4 | ON | OFF |
| | 100_14 | OFF | 0 | 3 | 3 | ON | OFF |
| | 100z_15 | ON | 1 | 4 | 2 | OFF | ON |
| | 100_16 | OFF | 0 | 5 | 1 | OFF | ON |
| | 100z1 | – | 0 | 6 | 6 | ON | OFF |

| | 71 | 72 | 73 | 74 | 75 | 76 | 77 |
|---|---|---|---|---|---|---|---|
| | NODE DEVICE ADDRESS | REDUNDANT NODE DEVICE ENABLE | REDUNDANCY TYPE | EAST HOP NUMBER | WEST HOP NUMBER | EAST ROUTE SELECTION | WEST ROUTE SELECTION |
| 70v | 100_11 | OFF | 0 | 0 | 0 | OFF | OFF |
| | 100_12 | OFF | 0 | 1 | 5 | ON | OFF |
| | 100z_13 | ON | 1 | 2 | 4 | ON | OFF |
| | 100_14 | OFF | 0 | 3 | 3 | ON | OFF |
| | 100z_15 | ON | 1 | 4 | 2 | OFF | ON |
| | 100_16 | OFF | 0 | 5 | 1 | OFF | ON |
| | 100z1 | - | 0 | 4 | 4 | ON | OFF |

| | NODE DEVICE ADDRESS (71) | REDUNDANT NODE DEVICE ENABLE (72) | REDUNDANCY TYPE (73) | EAST HOP NUMBER (74) | WEST HOP NUMBER (75) | EAST ROUTE SELECTION (76) | WEST ROUTE SELECTION (77) |
|---|---|---|---|---|---|---|---|
| 70w | 100_11 | OFF | 0 | 0 | 0 | OFF | OFF |
| | 100_12 | OFF | 0 | 1 | 5 | ON | OFF |
| | 100z_13 | ON | 1 | 2 | 4 | ON | OFF |
| | 100_14 | OFF | 0 | 3 | 3 | ON | OFF |
| | 100z_15 | ON | 1 | 4 | 2 | OFF | ON |
| | 100_16 | OFF | 0 | 5 | 1 | OFF | ON |
| | 100z1 | – | 0 | 2 | 2 | ON | ON |

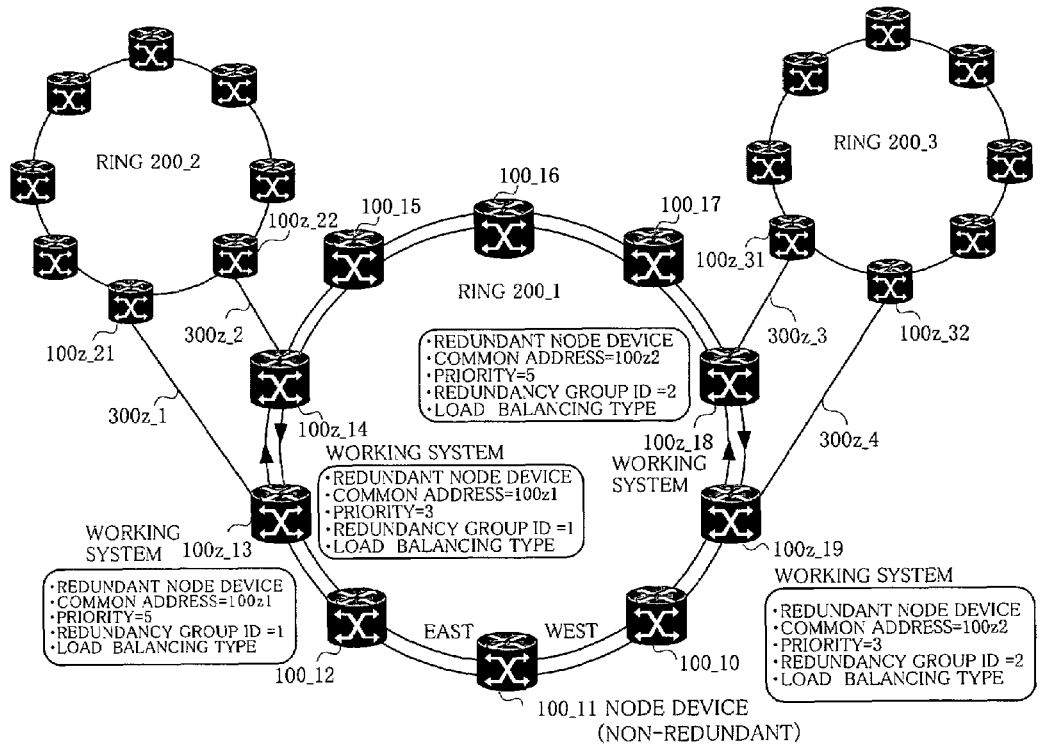

| NODE DEVICE ADDRESS | REDUNDANT NODE DEVICE ENABLE | REDUN-DANCY TYPE | REDUNDANT NODE DEVICE GROUP ID | EAST HOP NUMBER | WEST HOP NUMBER | EAST ROUTE SELECTION | WEST ROUTE SELECTION |
|---|---|---|---|---|---|---|---|
| 100_11 | OFF | 0 | - | 0 | 0 | OFF | OFF |
| 100_12 | OFF | 0 | - | 1 | 9 | ON | OFF |
| 100z_13 | ON | 1 | 1 | 2 | 8 | ON | OFF |
| 100z_14 | ON | 1 | 1,2 | 3 | 7 | ON | OFF |
| 100_15 | OFF | 0 | - | 4 | 6 | ON | OFF |
| 100_16 | OFF | 0 | - | 5 | 5 | ON | OFF |
| 100_17 | OFF | 0 | - | 6 | 4 | OFF | ON |
| 100_18 | OFF | 0 | - | 7 | 3 | OFF | ON |
| 100z_19 | ON | 1 | 2 | 8 | 2 | OFF | ON |
| 100_10 | OFF | 0 | - | 9 | 1 | OFF | ON |
| 100z1 | - | 0 | - | 3 | 8 | ON | OFF |
| 100z2 | - | 0 | - | 8 | 3 | ON | ON |

| STATE | OPERATION |
|---|---|
| INITIAL STATE ST10 | REDUNDANT ROUTE & RING ROUTE ARE IN BLOCKING STATE<br>TRANSMIT KEEP ALIVE MESSAGE OF "REDUNDANT STATE = INITIAL STATE" |
| WORKING STATE ST11 | REDUNDANT ROUTE & RING ROUTE ARE IN FORWARDING STATE<br>TRANSMIT KEEP ALIVE MESSAGE OF "REDUNDANT STATE = WORKING STATE" |
| PROTECTION STATE ST12 | REDUNDANT ROUTE & RING ROUTE ARE IN BLOCKING STATE<br>TRANSMIT KEEP ALIVE MESSAGE OF "REDUNDANT STATE = PROTECTION STATE" |

FIG.17B

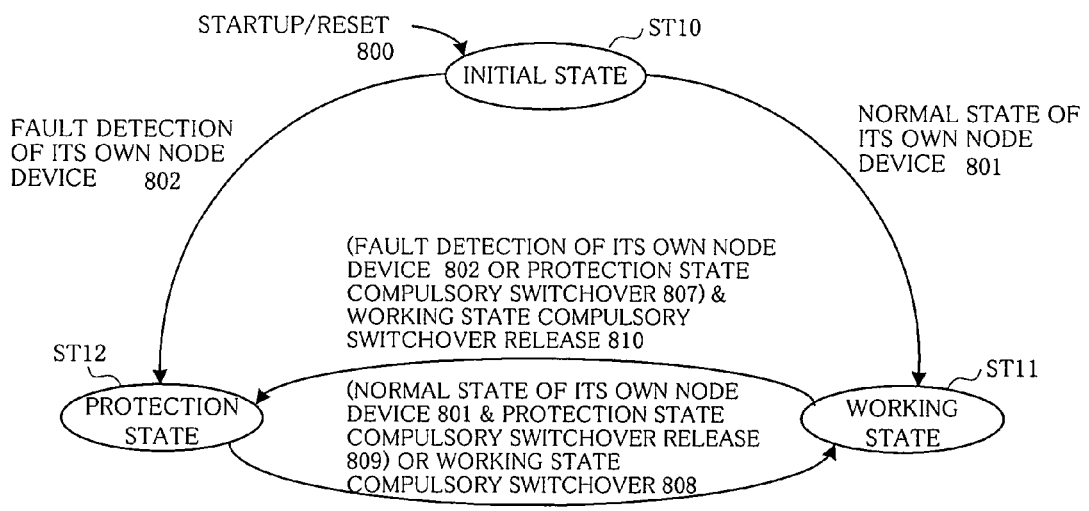

| | NODE DEVICE ADDRESS | REDUNDANT NODE DEVICE ENABLE | REDUN-DANCY TYPE | REDUNDANT NODE DEVICE GROUP ID | REDUNDANT STATE | EAST HOP NUMBER | WEST HOP NUMBER | EAST ROUTE SELECTION | WEST ROUTE SELECTION |
|---|---|---|---|---|---|---|---|---|---|
| | 71 | 72 | 73 | 78 | 79 | 74 | 75 | 76 | 77 |
| 70z | 100_11 | OFF | 0 | – | – | 0 | 0 | OFF | OFF |
| | 100_12 | OFF | 0 | – | – | 1 | 9 | ON | OFF |
| | 100z_13 | ON | 1 | 1 | WORKING | 2 | 8 | ON | OFF |
| | 100z_14 | ON | 1 | 1 | PROTECTION | 3 | 7 | ON | OFF |
| | 100_15 | OFF | 0 | – | – | 4 | 6 | ON | OFF |
| | 100_16 | OFF | 0 | – | – | 5 | 5 | ON | OFF |
| | 100_17 | OFF | 0 | – | – | 6 | 4 | OFF | ON |
| | 100z_18 | ON | 1 | 2 | WORKING | 7 | 3 | OFF | ON |
| | 100z_19 | ON | 1 | 2 | PROTECTION | 8 | 2 | OFF | ON |
| | 100_10 | OFF | 0 | – | – | 9 | 1 | OFF | ON |
| | 100z1 | – | 0 | – | – | 3 | 8 | ON | OFF |
| | 100z2 | – | 0 | – | – | 8 | 3 | OFF | ON |

| NODE DEVICE ADDRESS | EAST HOP NUMBER | WEST HOP NUMBER | EAST ROUTE SELECTION | WEST ROUTE SELECTION |
|---|---|---|---|---|
| 100_11 | 0 | 0 | OFF | OFF |
| 100_12 | 1 | 5 | ON | OFF |
| 100_13 | 2 | 4 | ON | OFF |
| 100_14 | 3 | 3 | ON | OFF |
| 100_15 | 4 | 2 | OFF | ON |
| 100_16 | 5 | 1 | OFF | ON |

70a

NODE DEVICE

BACKGROUND OF THE INVENTION

1. Field of the Invention

The present invention relates to a node device, and in particular to a node device composing a ring network connected to another network.

Recently, a traffic increase in an Ethernet (registered trademark) and the IP (Internet Protocol) packet-based Internet, a rapid increase of ADSL (Asynchronous Digital Subscriber Line) users and a rise of a VoIP (Voice over IP) technology have been remarkable. Thus, instead of a ring network using a conventional SONET/SDH (Synchronous Optical NETwork/Synchronous Digital Hierarchy) device, a packet ring network (hereinafter, occasionally and simply referred to as ring) which can directly process the packets on the ring and enables a bandwidth management of the packets and a statistical multiplexing effect is noticed. When such a packet ring network is connected to another network, it is required to connect the packet ring network to the other network with a plurality of node devices (hereinafter, referred to as redundant node devices) for enhancing a reliability of the network.

2. Description of the Related Art

FIG. 19 shows a network composed of a backbone network 210, a ring network 200a and a tree network 220. The backbone network 210 is composed of node devices 100z_11-100z_14, 100_15 and 100_16. The ring network 200a is composed of node devices 100z_21, 100z_22 and 100_23-100_27. The tree network 220 is composed of node devices 100z_31, 100z_32, 100_33-100_37. The redundant node devices 100z_11, 100z_12 and the redundant node devices 100z_13, 100z_14 (occasionally, represented by a reference numeral 100z; the node devices other than the redundant node devices are occasionally represented by a reference numeral 100 and occasionally referred to as non-redundant node devices) of the backbone network 210 are respectively connected to the redundant node devices 100z_22, 100z_21 of the ring network 200a and the redundant node devices 100z_32, 100z_31 of the tree network 220, whereby the backbone network 210 is connected to the ring network 200a and the tree network 220.

When a redundant network is composed by adding a redundant node device, numerous fibers are required for newly connecting the non-redundant node devices 100 to an added redundant node device 100z, in the tree network 220 and a mesh network (not shown). However, there is an advantage that only fibers for connecting adjoining node devices are required in the ring networks 200a and 210.

Also, when a node redundancy system is realized in the tree network 220 and the mesh network of a packet system like the Ethernet, a Spanning Tree Protocol (STP) is generally used. In the STP, a switchover to a detour route upon occurrence of a line fault or a node device fault requires almost one minute. Recently, a Rapid Spanning Tree Protocol (RSTP) that is an improved STP has been reviewed, which also requires several seconds of a switchover time.

In the node redundancy by this STP system or the like, a demand of a communication carrier or the like for i.e. equal to or less than 50 ms of a switchover time can not be satisfied, so that a node redundancy system with a higher reliability has not been provided.

On the other hand, as a ring protocol used in the ring network, there is an RPR (Resilient Packet Ring) protocol which brings about effects of statistical multiplexing and bandwidth reusing by directly processing the packets on the ring, and which realizes a fault recovering function (protection function) by a high speed switchover for equal to or less than 50 ms. For the RPR of the packet ring, standardization efforts have been pursued as IEEE802.17RPR. Together with this standardization, it is expected that the demand for the packet ring network noticed in a metro area grows more and more. It is to be noted that the RPR represents a recent packet ring, and is distinguished from a conventional token ring and an FDDI ring.

A node device and a redundant node device according to the present invention described later can be applied to the RPR. Therefore, a basic arrangement of a network, a topology table and a packet in the RPR will now be described by referring to FIGS. 20A, 20B and FIG. 21.

FIG. 20A shows an arrangement of a general RPR ring network. This network is a bidirectional double ring network (hereinafter, occasionally and simply referred to as ring) in which node devices 100a_11-100a_16 (occasionally, represented by a reference numeral 100a) supporting the RPR are connected in this order with outer and inner rings. It is to be noted that an RPR network 200a is not connected to another network in FIG. 20A, so that a node device corresponding to the redundant node device 100z is not arranged.

FIG. 20B shows an arrangement of a ring topology table 70a held in the node device 100a_11. This table 70a is composed of a node device address 71, an east hop number 74, a west hop number 75, an east route selection 76 and a west route selection 77. An address of each node device 100a is registered (an address identical to the reference numeral is registered in FIG. 20B) in the node device address 71. The number of hops to the position of another node device 100a starting from the node device 100a_11 in an east direction is registered in the east hop number 74. It is indicated that e.g. the node device 100a_13 is in the position of the hop number="2" from the node device 100a_11 in the east direction. The number of hops in a west direction is registered in the west hop number 75. It is indicated that e.g. the node device 100a_13 is in the position of the hop number="4" from the node device 100a_11 in the west direction.

The east route selection 76 and the west route selection 77 indicate from which of the east side, the west side or both sides the node device 100a transmits a packet addressed to another node device 100a. The packet is transmitted from the side where "ON" is set. For example, the packet addressed to the node device 100a_13 is transmitted from the outer ring on the east side since the east route selection="ON" and the west route selection="OFF". Thus, the packet reaches the node device 100a_13 with the hop number="2", which is fewer than the case of transmission from the inner ring on the west side by a hop number of "4"-"2"="2".

It is to be noted that "ON" and "OFF" of the east route selection 76 and the west route selection 77 are changed by a ring topology which changes by a fault of the route (link) and the node device. Namely, "ON" and "OFF" of the route selections 76 and 77 are determined so as to select an optimum route for distributing the packet at that time.

It is to be noted that while a topology table of another node device 100a is the same as that of the table 70a, only the values set in the east hop number 74, the west hop number 75, the east route selection 76 and the west route selection 77 are different from those in the table 70a.

FIG. 21 shows a format of a general RPR packet 700, that is composed of a Time To Live (TTL) 710, a Base_Ring_Control 720, a destination address 730, a source address 740, a TTL_Base 750, an Ex_Ring_Control 760, a Header_CRC 770, a protocol data unit (PDU) 780 and FCS 790. Since the detail of these fields is a basically known matter of the RPR, the description thereof will be herein omitted.

It is to be noted that the protection function is mounted on the RPR itself. Therefore, the RPR can notify a fault to each node device on the ring by transferring a protection message on an RPR layer (MAC sub-layer) upon occurrence of a line fault, a node device fault or the like.

Also, in the double ring arrangement of the RPR, a high-speed switchover to a detour route can be performed by switching over a ring which transmits the packets upon occurrence of the line fault or the like.

The characteristics of the RPR will now be summarized including the above-mentioned characteristics (see non-patent document 1):
(1) Bidirectional double ring network is supported;
(2) MAC (Media Access Control) layer (layer 2) is supported;
(3) Effective utilization ratio of bandwidth is high;
(4) Plug & Play is supported;
(5) Fault switchover time is equal to or less than 50 ms.

[Non-patent document 1] IEEE802.17 draft V2.1

However, in the IEEE802.17 RPR, a function concerning a node redundancy system which enables an arrangement of a working node device and a protection node device on the ring is not prescribed, and no addition of a node redundancy function to the IEEE802.17 RPR protocol itself is expected. Also, in an RFC2892 (The Cisco SRP (Spatial Reuse Protocol) MAC Layer Protocol) of the IETF which forms the basis of the IEEE802.17 RPR, an effective utilization of the bandwidth and the redundancy of the ring are enabled. However, nothing is prescribed therein for the node redundancy system in the ring network.

SUMMARY OF THE INVENTION

It is accordingly an object of the present invention to provide a redundant node device composing a ring network connected to another network with redundant node devices and a non-redundant node device, which enable a plurality of redundant node devices to be simultaneously operated as a working system, load balancing processing of packets in the redundant node device corresponding to fluctuations in the number of working redundant node devices upon fault occurrence/recovery of the redundant node device, and a node redundancy system which can support the RPR.

In order to achieve the above-mentioned object, a non-redundant node device, according to the present invention, composing a ring network connected to another network with a plurality of working redundant node devices comprises: a topology table; a transmitter transmitting topology information of the non-redundant node device itself; a topology table preparing portion preparing the topology table based on the topology information of the non-redundant node device itself, topology information received from a non-redundant node device, and topology information and redundancy information received from the non-redundant node device; and a packet distributor distributing received packets over the ring network based on the topology table.

Also, in order to achieve the above-mentioned object, a redundant node device composing a ring network and connected to another network comprises: a topology table; a transmitter transmitting topology information and redundancy information of the redundant node device itself; a topology table preparing portion preparing the topology table based on the topology information and the redundancy information of the redundant node device itself, topology information received from a non-redundant node device, and topology information and redundancy information received from a redundant node device; and packet distributor distributing received packets over the ring network based on the topology table.

Firstly, the definition of the redundant node device and the non-redundant node device will now be described.
(1) Redundant node device: This is a node device connecting a ring network, to which the device itself belongs, to another network with a redundant composition (plurality of node devices), whose reference numeral begins with "100z" and which will be occasionally represented by this reference numeral "100z".
(2) Non-redundant node device: This is a node device only connected to the ring network, to which the device itself belongs, and not connected to another network, whose reference numeral begins with "100" and which is represented by this reference numeral "100". Occasionally, it will be simply referred to as the node device 100.

It is to be noted that the redundant node device and the non-redundant node device are both occasionally referred to as "node devices". In this case, they are occasionally referred to as "node devices 100z and 100".

FIGS. 1A and 1B show networks including redundant node devices 100z and non-redundant node devices 100 according to the present invention. FIG. 1A shows two ring networks (hereinafter, occasionally and simply referred to as ring) 200_1 and 200_2. The ring 200_1 is composed of redundant node devices 100z_11 and 100z_12, and non-redundant node devices 100_13-100_16 connected with an inner ring 200i and an outer ring 200j in the ring form. The ring 200_2 is composed of redundant node devices 100z_21 and 100z_22, and non-redundant node devices 100_23-100_26 (hereinafter, occasionally represented by a reference numeral 100) connected with the inner ring 200i and the outer ring 200j in a ring form.

The redundant node devices 100z_11 and 100z_12 are respectively connected to the redundant node devices 100z_21 and 100z_22 with redundant links 300z_1 and 300z_2, whereby the ring 200_1 is connected to the ring 200_2.

Namely, the ring network 200_1 is composed of the non-redundant node devices 100_13-100_16 and the redundant node devices 100z_11 and 100z_12 according to the present invention, and is connected to the other ring network 200_2 with the redundant node devices 100z_11 and 100z_12. The redundant node devices 100z_11 and 100z_12 are both working redundant node devices. It is to be noted that the other network 200_2 is not limited to a ring network in the present invention, and may be a general network. Also, the ring network 200_1 is not limited to a bidirectional ring but may be a unidirectional ring.

Each of the node devices 100z and 100 composing the ring 200_1 is provided with a topology table, a transmitter, a topology table preparing portion and a packet distributor (not shown). The transmitter of the node device 100 transmits topology information of the device itself, and the transmitter of the redundant node device 100z further transmits redundancy information (e.g. information indicating that the device itself is a redundant node) of the redundant node device itself.

The topology table preparing portion prepares the topology table based on the topology information and the redundancy information received from other node devices 100z and 100. It is to be noted that the topology table includes the topology information of the node device itself, and includes, when the device is the redundant node device, the redundancy information of the redundant node device itself. The packet distributor distributes received packets over the ring network based on the topology table.

Thus, the packets are distributed based on the topology table including the redundancy information of the redundant node devices, thereby enabling the redundant node devices to be simultaneously operated as the working system. Namely, as shown in FIG. 1A, a packet addressed to the node device 100_25, for example, transmitted from the node device 100_15 is forwarded by the working redundant node device 100z_11, reaches the node device 100_25 through the redundant link 300z_1. A packet addressed to the node device 100_24 is forwarded by the working redundant node device 100z_12 and can reach the node device 100_24 through the redundant link 300z_2.

Also, the present invention may further comprise a controller enabling an operation mode which makes only a specific redundant node device a working system to be selected in addition to a mode in which the working redundant node devices operate, based on the redundancy information.

FIG. 1B shows the same ring networks 200_1 and 200_2 as those in FIG. 1A. The rings 200_1 and 200_2 are different from those of FIG. 1A in that they operate in a mode in which only the redundant node device 100z_11 is made a working system while the redundant node device 100z_12 is made a protection system. For example, the packet addressed to the node device 100z_25 transmitted from the node device 100_15 is forwarded by the working redundant node device 100z_11 and reaches the node device 100_25 through the redundant link 300z_1. However, the packet is blocked by the protection redundant node device 100z_12, and does not reach the node device 100_25 through the redundant link 300z_2.

Thus, it becomes possible to switch over the mode of the redundant node devices, and to use a specific redundant node device among them as the working system.

Also, in the present invention, the packet distributor may determine, when the redundant node device itself is a working system, a forwarding packet based on a number of working redundant node devices, a destination address of a packet indicated in the topology table and a preset calculation.

Namely, when the redundant node device itself is a working system, the packet distributor recognizes the number of working redundant node devices from the topology table, and determines whether or not the received packet is forwarded based on a destination address of the received packet, and a preset calculation such as a hash operation. Thus, it becomes possible to balance the load of the packets between the working redundant node devices.

Also, in the present invention, the packet distributor may recognize a number of node devices over the ring network based on the topology table, may store a value equal to or more than the number of node devices in a time to live (TTL) of a packet addressed to the redundant node device and when a source address of a received packet is the same as an address of the node device itself, may delete the packet.

Thus, unnecessary packets are prevented from going around the ring. It is to be noted that the number of node devices is a number including the number of redundant node devices.

Also, in the present invention, the packet distributor may recognize a number of node devices over the ring network based on the topology table, and may store the number of node devices in a time to live of a packet addressed to the redundant node device to be distributed.

Thus, a time to live (TTL) of the packet assumes "0" at the node device having transmitted the packet, so that the packet is deleted, and unnecessary packets are prevented from going around the ring.

Also, in the present invention, the packet distributor may obtain a number of hops to a redundant node device at a farthest end from the node device itself as a starting point in an east ring (inner ring) or a west ring (outer ring) based on the topology table, may store the number of hops in a time to live of a packet addressed to a redundant node device and may transmit a packet to a ring side indicating the farthest end.

Thus, the time to live (TTL) of the packet assumes "0" at the redundant node device at the farthest end, the packet is deleted, and unnecessary packets are prevented from going around the ring.

Also, in the present invention, the packet distributor may obtain a number of hops to each redundant node device from the node device itself as a starting point in an east ring and a west ring respectively based on the topology table, may determine a redundant node device which distributes a packet from the east ring or the west ring so that an available bandwidth on each ring becomes optimum based on the number of hops, may obtain the number of hops to a redundant node device at a farthest end within the redundant node devices and may transmit a packet which stores the number of hops in a time to live to an east ring side or a west ring side.

Thus, the time to live (TTL) of the packet assumes "0" at the redundant node device at the farthest end of the east ring and the west ring, the packet is deleted, both of the east and west rings are used and unnecessary packets are prevented from going around the ring.

It is to be noted that each node device can independently select any of the above-mentioned packet distributing systems so as to improve the available bandwidth in the best way.

Also, in the present invention, the topology table may register a common address of the redundant node devices and the packet distributor may transmit a packet addressed to the redundant node devices using the common address.

Thus, it becomes possible for each node device to distribute packets through the working redundant node device addressed to a common address, and it becomes unnecessary to designate the working redundant node device through which the transmitted packet passes.

Also, in the present invention, the topology table preparing portion may register different common addresses corresponding to networks respectively in the topology table and the packet distributor may transmit a packet addressed to the redundant node devices using the common addresses.

Thus, it becomes possible to connect a plurality of networks to the ring network through a plurality of redundant node devices.

Also, in the present invention, the topology table preparing portion may register the different common addresses for the networks associated with the redundant node device to be registered.

Thus, it becomes possible to connect the ring network to a plurality of networks with a single redundant node device.

Also, in the present invention, the redundancy information may include redundancy group information.

Namely, when the ring network is connected to two or more networks where the redundant node devices are respectively arranged, a plurality of redundant node devices connecting the ring network are grouped corresponding to the networks connected. The redundant node device can include a group to which the redundant node device itself belongs in the redundancy information as redundancy group information. Thus, it becomes possible to connect two or more networks to the ring network to which the redundant node device itself belongs.

Also, in the present invention, the packet distributor may register source address information of a packet in a transmission management table of the redundant node device itself regardless of an operation state (working system or protection system) of the redundant node device itself, and may distribute packets after a switchover of a redundant node device by referring to the registered information.

Generally, the packet distributor is provided with a transmission management table (e.g. MAC table; not shown) managing source address information of a packet. Even when the packet distributor in the redundant node device is in a state (e.g. protection state) in which the device does not distribute the packets, the packet distributor registers the source address information of the packet in the transmission management table. It becomes possible for the packet distributor to distribute the packets based on the source address information of the latest transmission state management table after the node device itself switches over from the protection system to the working system. Thus, it becomes possible for the packet distributor to avoid flooding due to a non-registration of the source address information.

Also, in the present invention, the packet distributor may synchronize a transmission management table of the redundant node device itself with a transmission management table of another redundant node device of a same redundancy group.

Namely, the packet distributor synchronizes registration information of the transmission management table of the device itself with the registration information (source address information) of the transmission management table of the other redundant node device in the same redundancy group (group of the redundant node devices connected to the same network). Namely, the registration information of the redundant node device itself corresponding to the registration information of the transmission management table of the other redundant node device is stored in the transmission management table. Thus, it becomes possible for the packet distributor to avoid the flooding due to the non-registration of the source address information.

Also, in the present invention, the packet distributor may discard packets received from the redundant node device from a time when a reception ring or a time to live of a packet received from another redundant node device changes until a preset time elapses.

Thus, it becomes possible to prevent a packet double reception and a reverse of a packet reception order from occurring after the redundant node device switchover.

Also, in the present invention, the packet distributor may broadcast a packet indicating an occurrence of a switchover of the redundant node device when a change of a reception ring or a time to live of a packet received from another redundant node device is detected, and may discard packets received from the redundant node device from a time when the broadcast packet is received from another node device until a preset time elapses.

Thus, it becomes possible to prevent the packet double reception and the reverse of the packet reception order from occurring after the redundant node device switchover.

Also, in the present invention, the packet distributor may not transmit a received packet from another redundant node device from a time when a state change of another redundant node device is detected until a preset time elapses.

Thus, it becomes possible to prevent the packet double reception and the reverse of the packet reception order from occurring after the redundant node device switchover.

Also, the present invention may further comprise a controller switching over a redundant state of the redundant node device itself, based on a state switchover command designating a redundant state.

Thus, it becomes possible to compulsorily switch over the redundant state (working state, protection state or the like) of the redundant node device.

Also, in the present invention, the redundancy information may include a redundant state of a redundant node device having transmitted the redundancy information, and the topology table preparing portion having received the redundant state may register the redundant state of the redundant node device in the topology table.

By referring to the topology table, it becomes possible for an operator to recognize the redundant state (working state, protection state or the like) of the redundant node device.

Also, in the present invention, the ring network may comprise an RPR ring network, and the transmitter and the packet distributor may correspond to an RPR.

Thus, it becomes possible to realize a high-speed switchover function equal to or less than 50 ms of the RPR together with the node redundancy function.

Also, in the present invention, the packet distributor may specify a source redundant node device of a packet by using a set value of a TTL_BASE and a TTL field of an RPR packet received.

When the source of the received packet is the redundant node device, it is not possible to determine which redundant node device has transmitted the packet since the source address 740 (see FIG. 21) of the packet stores the common address. Therefore, the packet distributor uses numerical values set in the fields (see FIG. 21) of the TTL_BASE 750 (=initial value of TTL) and the TTL 710 of the received RPR packet 700, obtains the hop number="TTL_BASE"—"TTL" from the source redundant node device to the node device itself, and specifies the source node device based on the hop number and the topology table.

Also, in the present invention, the packet distributor may discard a received packet whose source is a protection redundant node device, and may display an alarm indicating reception of the packet.

Thus, it becomes possible to discard the packet transmitted by the protection redundant node device which originally does not transmit packets.

Also, in the present invention, the packet distributor may provide an individual address of the redundant node device itself to a source address of an OAM packet.

Namely, when an OAM packet is a packet confirming a normality in a route of access up to e.g. a specific node device, the packet distributor provides not a common address but an individual address as address information of the redundant node device itself to the source address of the OAM packet. Thus, it becomes possible for the packet distributor to return specific route information to a packet source.

Also, in the present invention, the packet distributor may determine whether or not a received packet is forwarded based on attribute information of the received packet and a priority of the redundant node device itself.

When a plurality of working redundant node devices perform the load balancing of the received packets, whether or not the received packet is forwarded is determined based on the attribute of the received packet, e.g. address information, protocol identifying information or the like and a priority between the redundant node devices, instead of the hash operation. Thus, it becomes possible to prevent the redundant node devices from transmitting the same packet.

Furthermore, in the present invention, the transmitter may store the redundancy information in a control packet of an RPR packet in a form of a TLV to be broadcast over the ring network.

Thus, it becomes possible to enhance a function in the future.

As described above, the node device of the present invention enables a plurality of redundant node devices to be simultaneously operated as a working system. Also, the node device of the present invention enables load balancing processing of packets in the redundant node device corresponding to fluctuations in the number of working redundant node devices upon fault occurrence/recovery of the redundant node device. Also, it becomes possible to mount thereon an RPR node redundancy function with a high-speed switchover and with high general versatility, so that reliability and performance of a ring network efficiently using network resources such as fibers can be improved.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 5A-5C are diagrams showing an example of a state transition in a redundant node device according to the present invention;

FIGS. 11A and 11B are diagrams showing an operational embodiment (5) of a node device according to the present invention;

FIGS. 17A and 17B are diagrams showing an operational embodiment (11) of a node device according to the present invention;

DESCRIPTION OF THE EMBODIMENTS

Composition Embodiment of Redundant Node Device

Figure 1A:
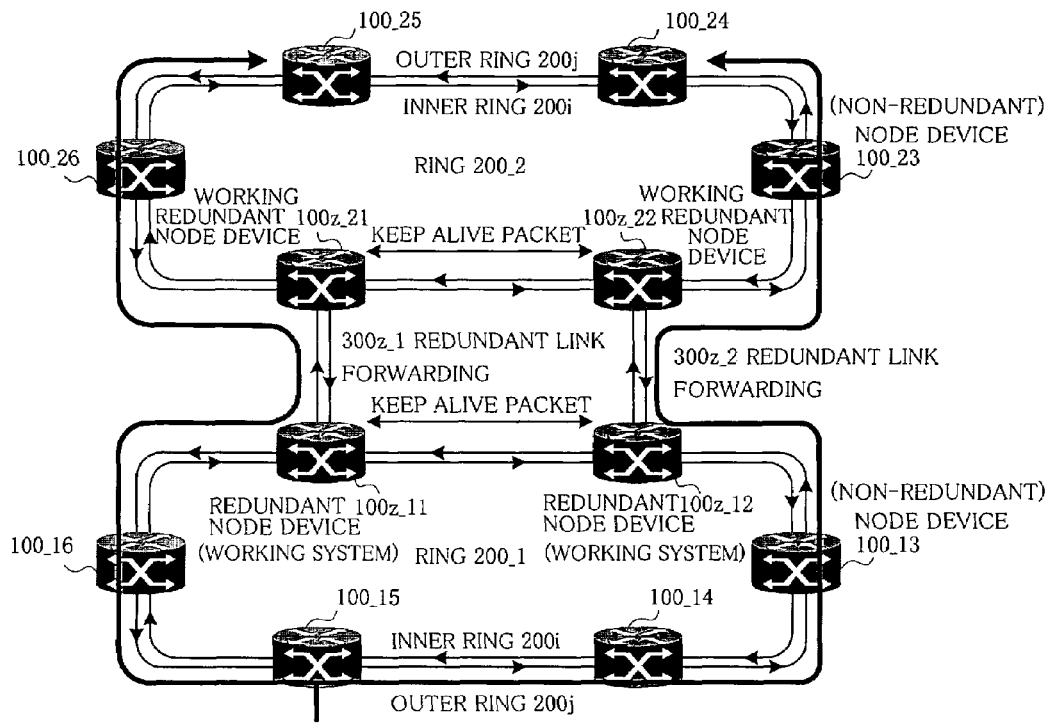
FIGS. 1A and 1B are block diagrams showing a principle of a node device according to the present invention.
Figure 1B:
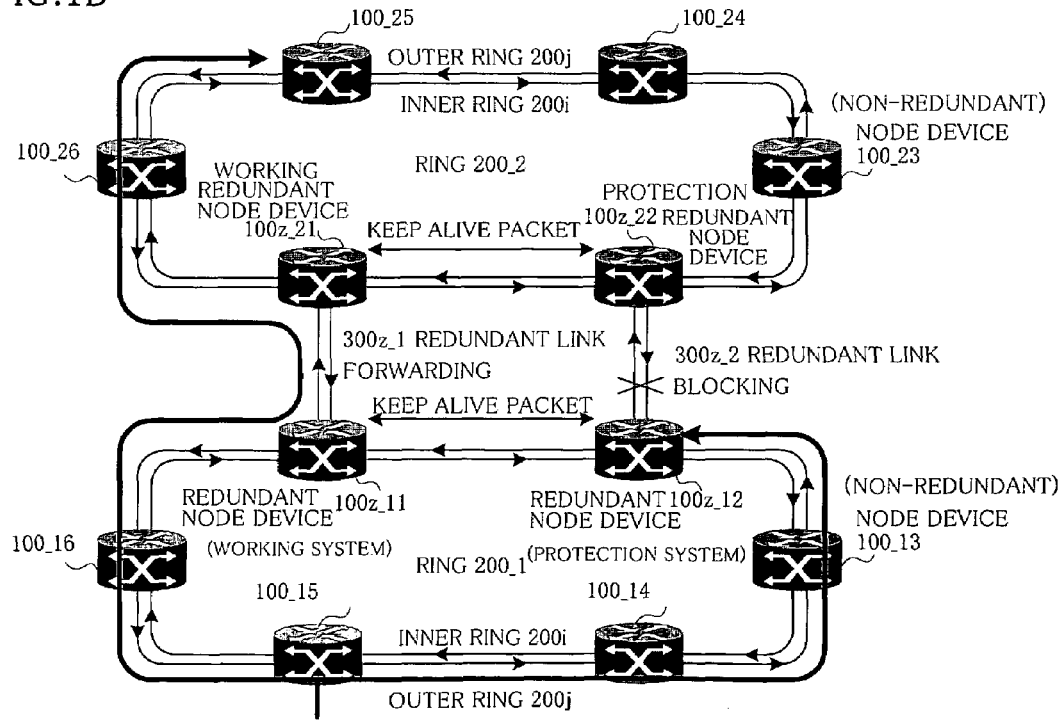
Figure 2:
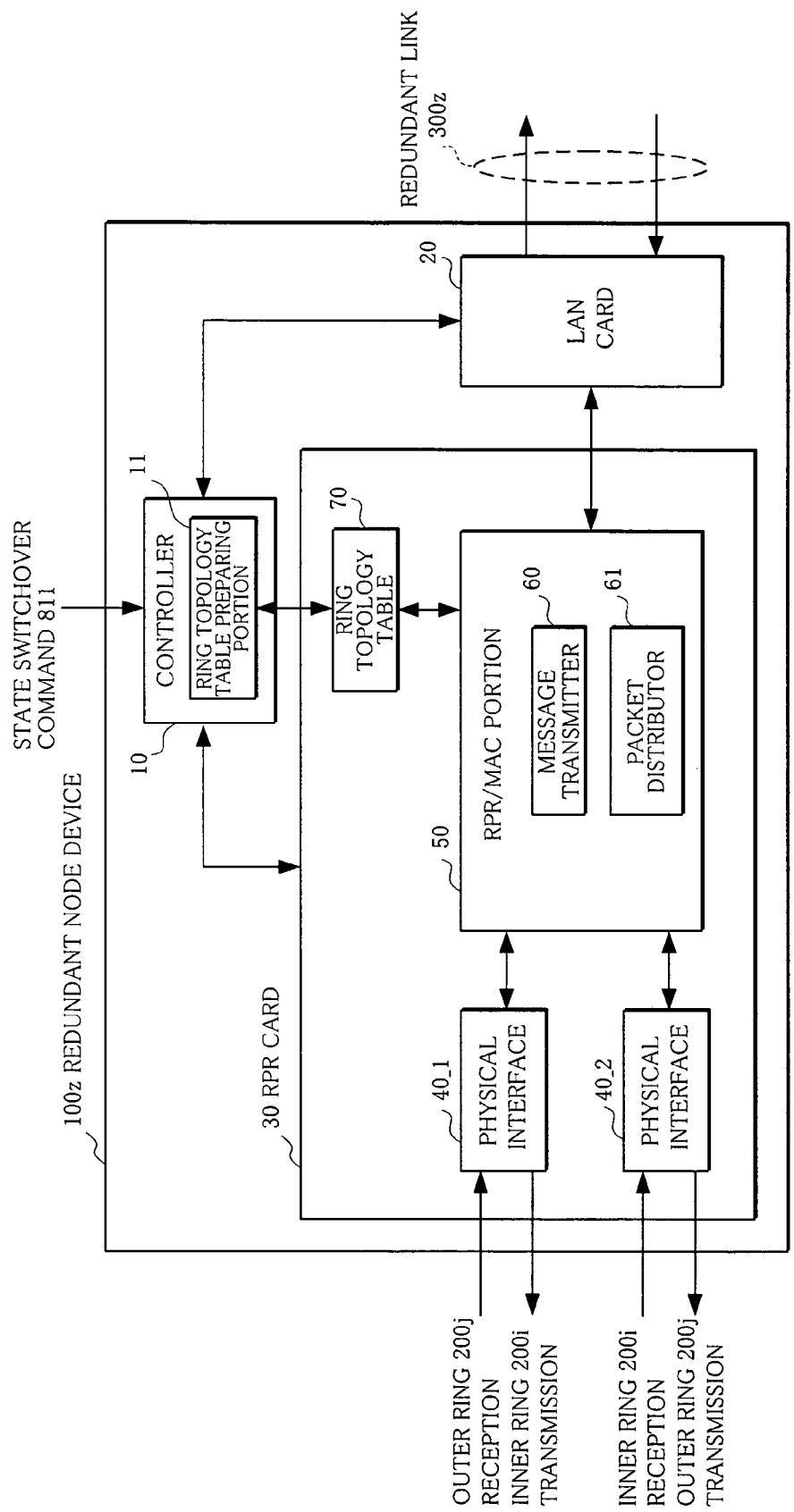
FIG. 2 is a block diagram showing a composition embodiment of a redundant node device according to the present invention.

FIG. 2 shows a composition embodiment of the redundant node device 100z (redundant node devices other than node devices 100_13-100_16 in the ring 200_1 shown in FIG. 1A) according to the present invention. This redundant node device is provided with a LAN card 20, an RPR card 30 and a controller 10 controlling the cards 20 and 30. The LAN card 20 is for connecting to the other network 200_2 (see FIG. 1A) through the redundant link 300z. The RPR card 30 is connected in the ring form together with the node device (non-redundant) 100 described later to compose an RPR ring network 200_1 (see FIG. 1A).

The RPR card 30 is provided with physical interfaces 40_1 and 40_2, an RPR/MAC portion 50 and topology table 70. The physical interface 40_1 interfaces a reception packet from the outer ring and a transmission packet to the inner ring to the RPR/MAC portion 50.

Similarly, the physical interface 40_2 interfaces the reception packet from the inner ring and the transmission packet to the outer ring to the RPR/MAC portion 50.

The RPR/MAC portion 50 is provided with a message transmitter 60 and a packet distributor 61. The controller 10 is provided with a ring topology table preparing portion 11.

Composition Embodiment of Non-redundant Node Device

Figure 3:
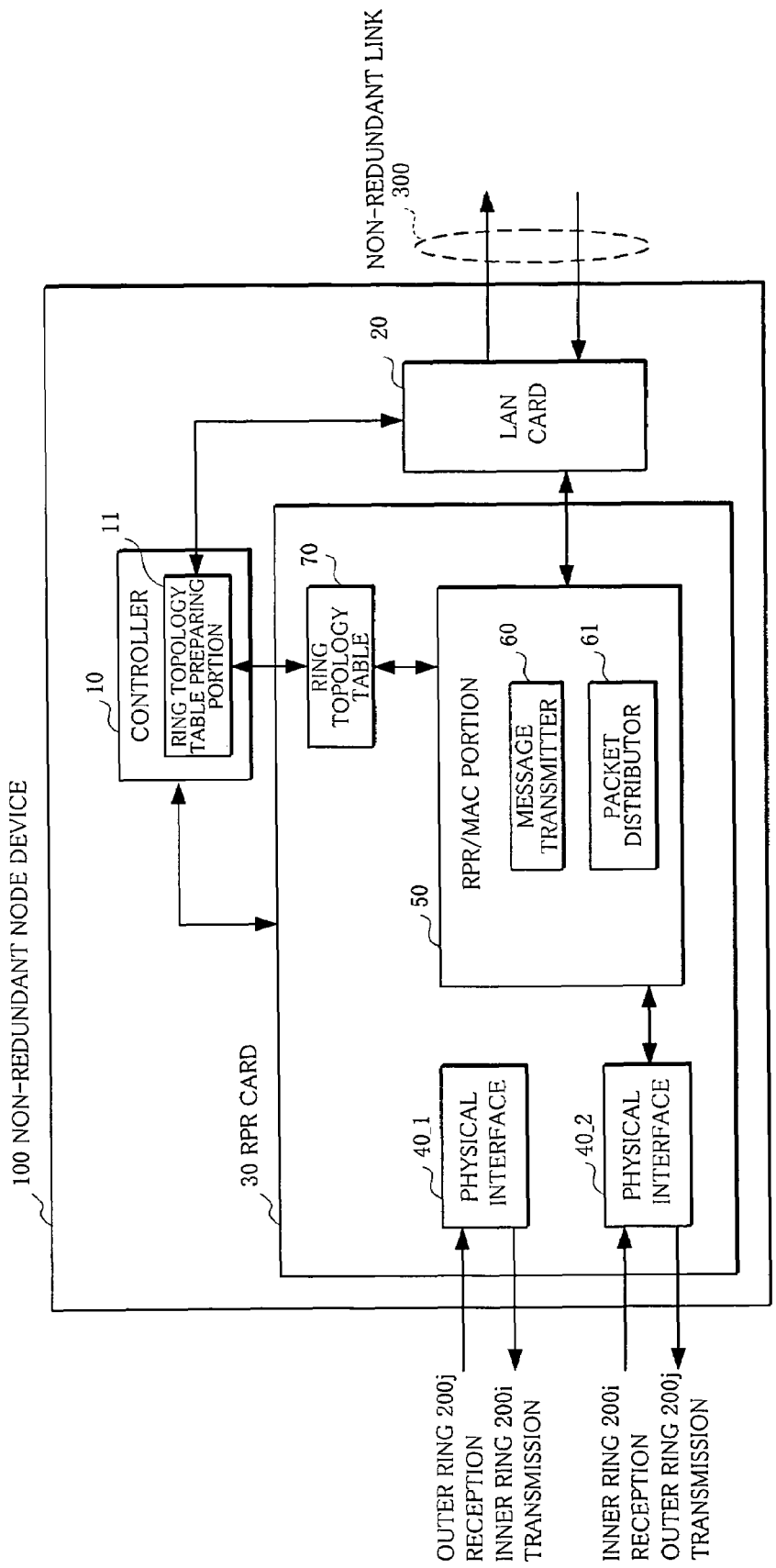
FIG. 3 is a block diagram showing a composition embodiment of a non-redundant node device according to the present invention.

FIG. 3 shows a composition embodiment of the non-redundant node device (hereinafter, occasionally and simply referred to as node device) 100 (node devices other than the redundant node device 100z shown in FIG. 2) according to the present invention. This node device 100 is different from the redundant node device 100z in that the redundant link 300z does not exist occasionally. The arrangement of the RPR card 30 is the same as that of the RPR card 30 of the redundant node device 100z.

The following parameters (1)-(7) can be inputted as an initial setting to the redundant node device 100z and the node device 100 shown in FIGS. 2 and 3.

(1) Redundant node enable/disable: This is a parameter set in all of the node devices and redundant node devices on the ring, and indicates whether or not the device itself is a redundant node device.

(2) Priority: This is a parameter set only in the redundant node device for which the redundant node enable/disable parameter is set to "enable", and determines whether the redundant node device is a working system or a protection system.

(3) Individual address: This is a parameter set in all of the node devices on the ring, is an individual address indicating the node device itself on the ring, and must not be overlapped with an address value of another node device on the ring.

(4) Common address: This is a parameter set only in the redundant node device, is a common address of the redundant node device on the ring, and must not be overlapped with an individual address value on the ring.

(5) Transmission timer value: This is a parameter set only in the redundant node device, and is a transmission interval timer value of a keep alive packet 700x.

(6) Reception timeout value: This is a parameter set only in the redundant node device, and a timeout value for detecting a reception timeout of the keep alive packet 700x from a mate system (a redundant node device which has a redundant link for the same external network, and which is not the redundant node device itself).

(7) Redundancy type: This is a parameter set only in the redundant node device, and indicates that a state type of the redundant node device itself is either a load balancing type or a non-load balancing type.

The load balancing type indicates an operation mode which allows a plurality of redundant node devices 100z to be simultaneously working in the same redundancy group (the group of redundant node devices with the same common address) on the ring. The non-load balancing type indicates the operation mode which allows only a single working redundant node device 100z to be performed at a time.

The above-mentioned parameters (1)-(7) are initially set by an operator who is aware of a network composition, a network monitoring device or the like.

Before describing the operational embodiment of the node device 100 and the redundant node device 100z, the format of the keep alive packet 700x transmitted by the redundant node devices 100z_11 and 100z_12 (see FIG. 1A) and a state transition of each redundant node device 100z will now be firstly described.

Figure 4:
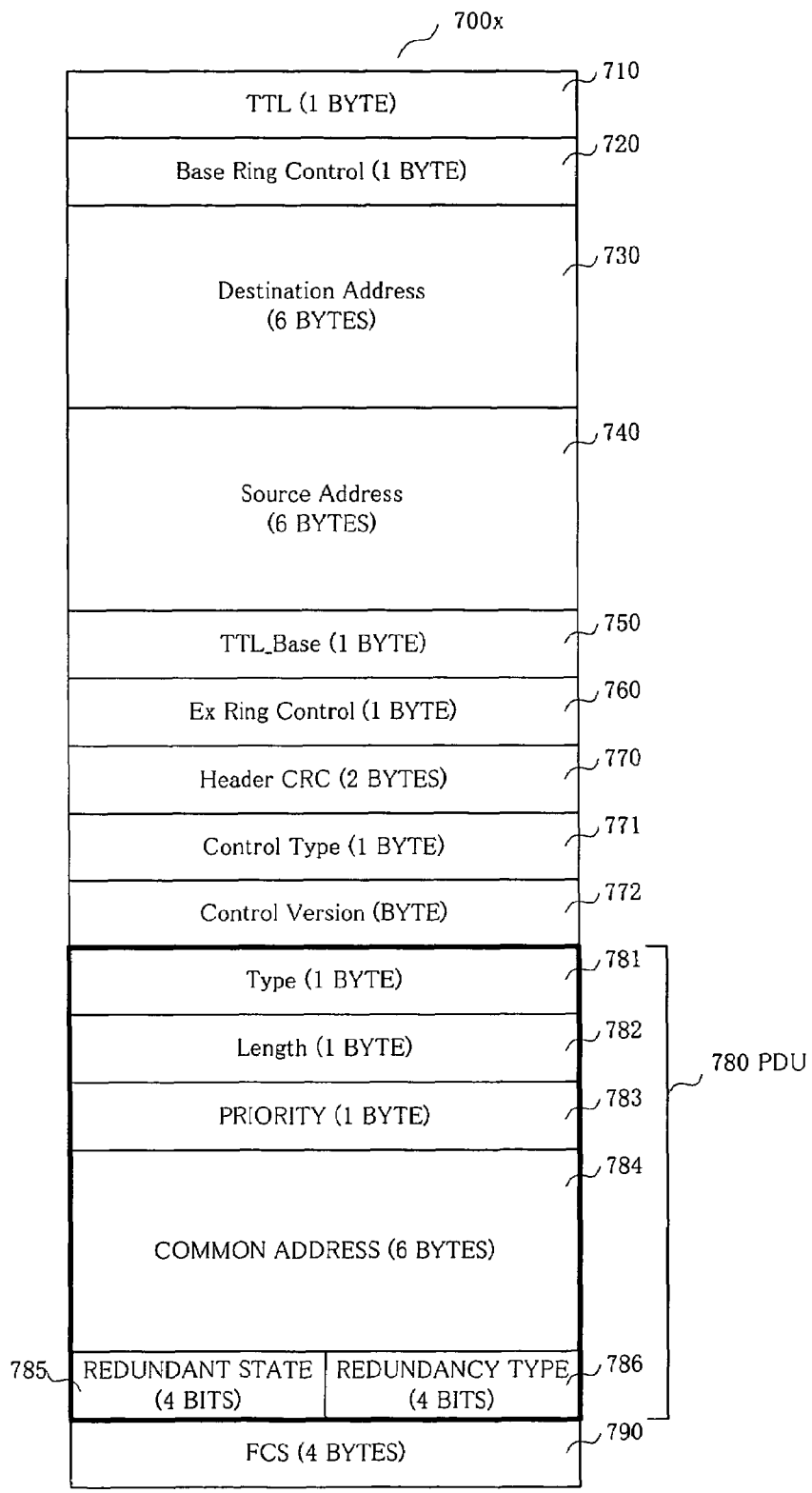
FIG. 4 is a diagram showing an arrangement of a keep alive packet in the present invention.

FIG. 4 shows an arrangement of the keep alive packet (message) 700x transmitted from the redundant node device 100z. As the packet 700x, a control packet (specifically an OAM message in the control packet) among RPR packet types is used. By using this control packet as the keep alive packet 700x, termination processing of the packet 700x is simplified and an overflow of the packet 700x outside the ring 200_1 can be avoided. It is to be noted that the keep alive packet 700x of the present invention is not limited to the RPR control packet.

Figure 21:
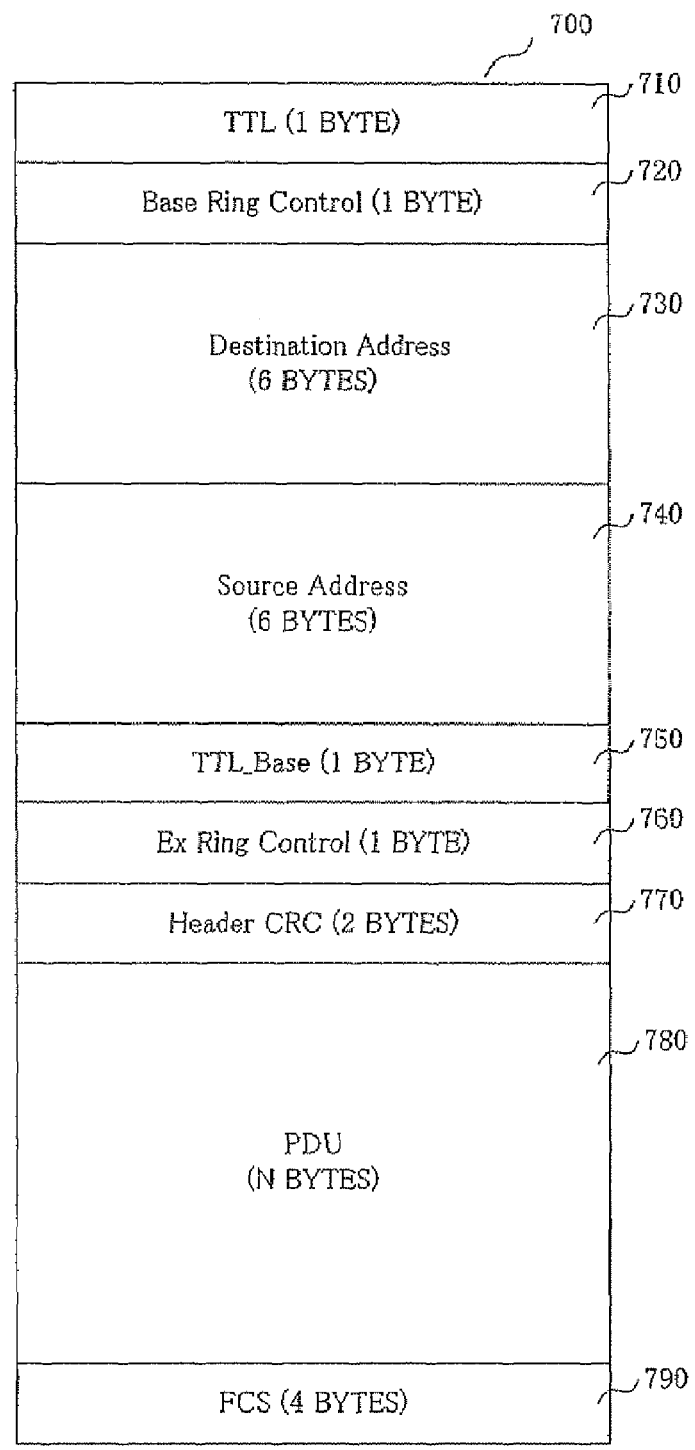
FIG. 21 is a diagram showing a format of a general RPR packet.

The packet 700x is different from the RPR packet 700 shown in FIG. 21 in that a Control_Type 771 and a Control_Version 772 are added, and the fields of type 781 of one byte, length 782 of one byte, priority 783 of one byte, common address 784 of six bytes, redundant state 785 of four bits, and redundancy type 786 of four bits are set in the PDU 780.

The Control_Version 772="0x00" and the Control_Type 771="0x03" being stored indicates that the packet 700x is the OAM message of the present version. The type 781 indicates a data type accommodated in the PDU 780, and the length 782 indicates a data length of the PDU 780 portion including the fields of the type 781 and the length 782. Thus, when keep alive information accommodated in the packet 700x is changed, a function enhancement is enabled by newly defining a type value. Also, when the data length of the keep alive information is changed together with the function enhancement, the change can be supported by designating a new data length to the field of the length 782.

The redundant state 785 indicates a present state of the redundant node device 100z, and indicates any of an initial state, a working state and a protection state (see state transition described next).

A broadcast address is set to the destination address 730 of the keep alive packet 700x. Thus, the all of the node devices on the ring receive the packet 700x. Also, an individual address of the source node device which transmits the keep alive packet 700x is set to the source address 740.

The MAX value 255 is stored in the TTL 710, and a control packet is designated in the packet type 771.

The redundant node device 100z transmits the keep alive packet 700x at a time interval set by a "transmission timer value", and notifies the present redundant state, redundancy type, priority and common address of the redundant node device 100z itself to all of the node devices 100 and 100z on the ring including the redundant node device of the mate system (redundant node device connected to another same network). The other node devices 100 and 100z receive the keep alive packet 700x, and recognize the present redundant state, redundancy type, priority and common address of the transmission side device.

Also, the redundant node device of the mate system performs monitoring a keep alive packet reception timeout at a larger cycle than the "transmission timer value". This timeout value complies with a parameter of the reception timeout value. Since there is an enough possibility of a disappearance of the keep alive packet 700x from the ring by packet discard processing due to a bit error or the like, a value larger than the transmission timer to some extent is required to be set to the reception timeout value by expecting an occurrence of a packet loss of one or two packets.

When the keep alive message 700x is not received after a time set by the "reception timeout value" has elapsed (keep alive message timeout), the redundant node device 100z of the mate system regards that a fault has occurred in the redundant node device 100z on the transmission side. It is to be noted that when the redundant node device 100z detects e.g. a fault of the redundant node device 100z itself and becomes the redundant state="protection system", the keep alive packet 700x can be immediately transmitted regardless of the time interval of the "transmission timer value". Thus, it becomes possible to switch over the redundant node device at a high speed.

FIGS. 5A-5C show a state transition of the redundant node device 100z. FIG. 5A shows states which the redundant node device 100z can assume, namely, an initial state ST10, a working state ST11 and a protection state ST12 when the redundant node device 100z operates as a load balancing type, an initial state ST20, a working state ST21 and a protection state ST22 when the redundant node device 100z operates as a non-load balancing type. While the states ST10, ST11 and ST12 of the load balancing type are respectively the same as the states ST20, ST21 and ST22 of the non-load balancing type, transition conditions are different from each other. Operation in each state of the redundant node device 100z will now be described.

(1) Initial states ST10 and ST20: The redundant node device 100z makes a redundant route and a ring route a blocking state, and transmits the keep alive message 700x (see FIG. 4) indicating "redundant state 785 of the redundant node device 100z itself"="initial state" to another redundant node device 100z.

(2) Working states ST11 and ST12: The redundant node device 100z makes the redundant route and the ring route a forwarding state, and transmits the keep alive message 700x indicating "the redundant state 785 of the redundant node device 100z itself"="working state" to the other redundant node device 100z.

(3) Protection states ST12 and ST22: The redundant node device 100z makes the redundant route and the ring route a blocking state, and transmits the keep alive message 700x indicating "the redundant state 785 of the redundant node device 100z itself"="protection state" to the other redundant node device 100z.

FIG. 5B shows a state transition in a case where the redundant node device 100z operates as a load balancing type. Firstly, upon startup or reset, the redundant node device 100z is set to the initial state ST10. When the redundant node device 100z is in the initial state ST10 and is in a fault detection of the redundant node device 100z itself 802 or a normal state of the redundant node device 100z itself 801, the redundant node device 100z transitions to the protection state ST12 or the working state ST11 respectively. Also, when the redundant node device 100z is in the protection state ST12 and is in the normal state of the redundant node device 100z itself 801, the redundant node device 100z transitions to the working state ST11. When the redundant node device 100z is in the working state ST11 and is in the fault detection of the node device itself 802, the redundant node device 100z transitions to the protection state ST12.

FIG. 5C shows a state transition in a case where the redundant node device 100z operates as a non-load balancing type. While these state transition conditions are the same as the basic transition conditions shown in FIG. 5B, other conditions (1)-(3) (namely, condition (1)=state of the redundant node device of the mate system; condition (2)=priority with the mate system; condition (3)=timeout detection of keep alive message 806) are added besides the basic conditions.

New transition conditions are summarized as follows:
(1) Condition for transition from the initial state ST20 to the working state ST21: Basic condition 801, and "Keep alive message timeout detection 806, or "Mate system initial state MST20" and "priority of the node device itself is "higher" than that of mate system", or Mate system protection state MST22";
(2) Condition for transition from the initial state ST20 to the protection state ST22: Basic condition 802, or "Redundant node device of mate system="initial state" and priority of the node device itself is "lower" than that of mate system", or Mate system is in working state MST11;
(3) New condition for transition from the working state ST21 to the initial state ST20: Redundant node device of the mate system="working state"
(4) Additional condition for transition from the working state ST21 to the protection state ST22: Base condition 802, and "Redundant node device of the mate system is in normal state 801"
(5) Additional condition for transition from the protection state ST22 to the working state 211: Basic condition 801, and "Keep alive message timeout detection 806, or Mate system protection state MST20"

Basic Network Arrangement and Ring Topology Table Arrangement

Figures 6A, 6B:
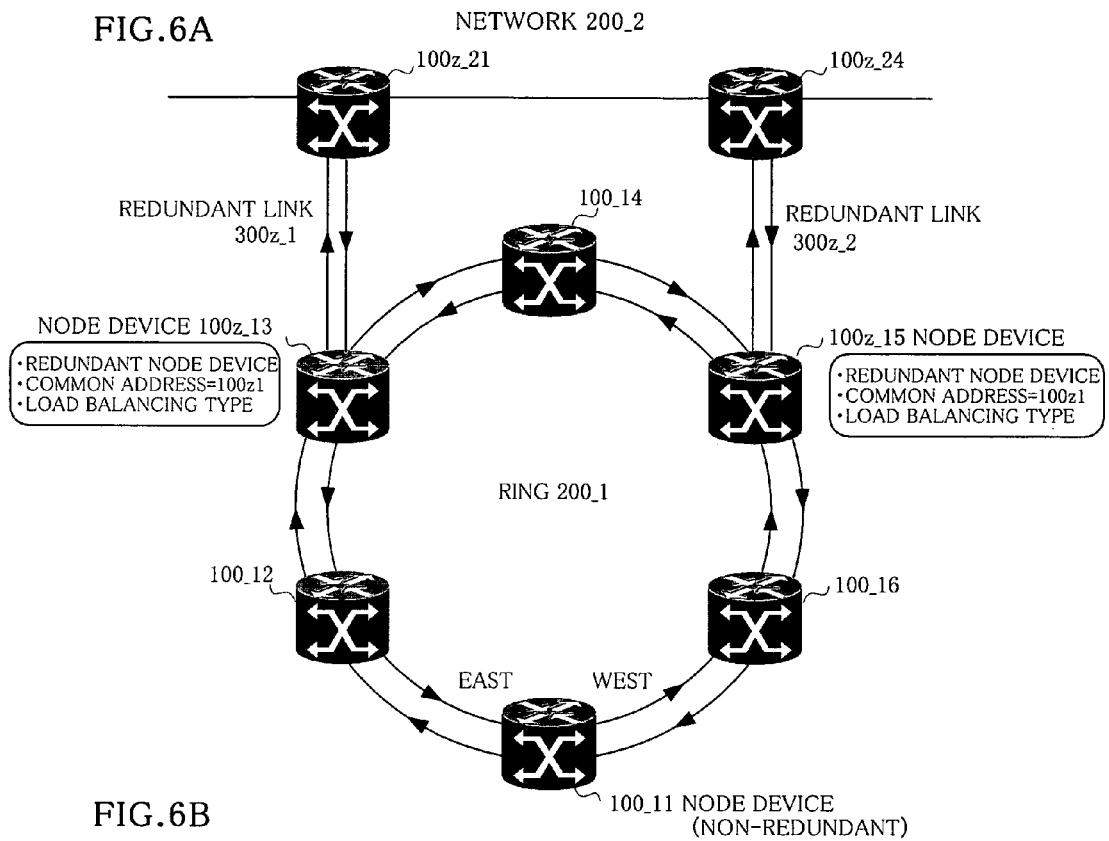
FIGS. 6A and 6B are diagrams showing examples of a basic ring network composed of a non-redundant node device and a redundant node device according to the present invention and a ring topology table.

FIG. 6A shows the basic ring network 200_1 composed of the node device 100 and the redundant node device 100z of the present invention. In FIG. 6A, the node devices 100_11, 100_12, the redundant node device 100z_13, the node device 100_14, the redundant node device 100z_15, the node device 100_16 are connected in this order to compose the ring 200_1. This ring 200_1 is connected to the other network 200_2 through the redundant node device 100z_13 and the redundant link 300z_1 as well as the redundant node device 100z_15 and the redundant link 300z_2.

Figures 20A, 20B:
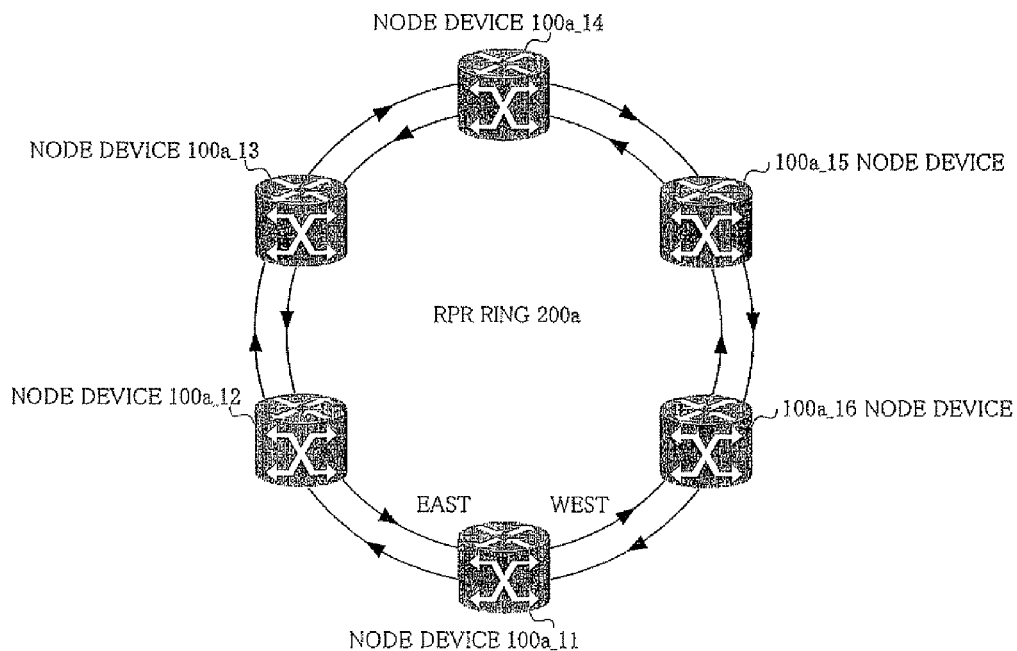
FIGS. 20A and 20B are diagrams showing a ring network composed of conventional node devices and a ring topology table.

FIG. 6B shows an arrangement of a ring topology table 70t held in the node devices 100 and 100z. FIG. 6B specifically shows the ring topology table 70t held in the node device 100_11. This table 70t is different from the conventional ring topology table 70a shown in FIG. 20B in that a redundant node device enable 72 and a redundancy type 73 are added, and a common address="100z1" of the redundant node devices 100z_13 and 100z_15 is further registered in the node device address 71. The information is related to the node redundancy, and is transmitted to the node devices 100 and 100z by the keep alive message 700x (see FIG. 4).

"ON" is set to the redundant node device enable 72 when the node device is a redundant node device, while "OFF" is set thereto when the node device is not the redundant node device (non-redundant node device). "1" is set to the redundancy type 73 when the operation type of the redundant node device 100z is the load balancing type, while "0" is set thereto when the operation type is the non-load balancing type. Also, the maximum hop number="6" is set to the east hop number 74 and the west hop number 75 of the node device address 71="common address 100z1". The east route is selected, so that the east route selection 76="ON" is set. The table 70t held in the other node device 100 or redundant node device 100z is the same as that of FIG. 6B, and only the set values of the hop numbers 74 and 75, the route selections 76 and 77 are different.

Operational Embodiment (1)

Figures 7A, 7B:
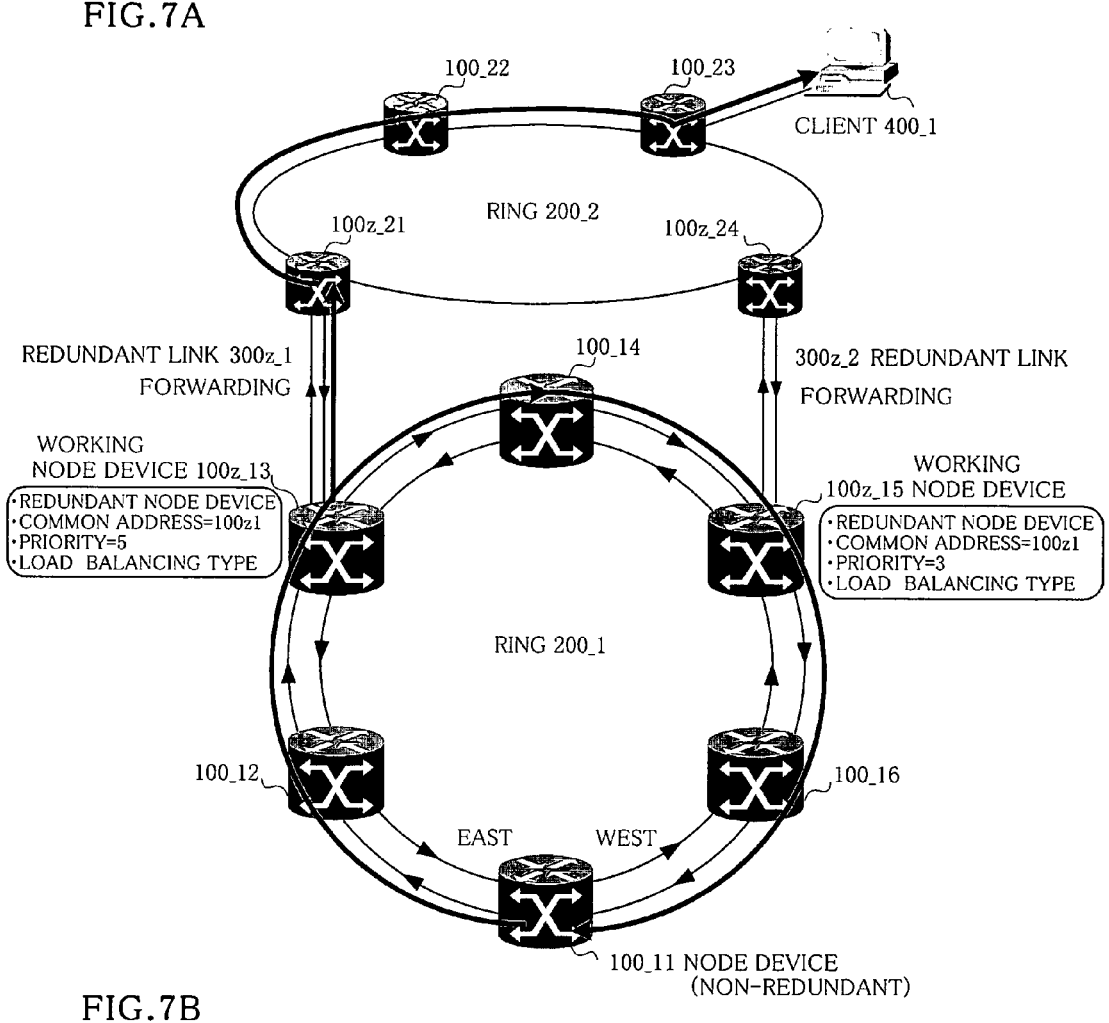
FIGS. 7A and 7B are diagrams showing an operational embodiment (1) of a node device according to the present invention.

FIGS. 7A and 7B show an operational embodiment (1) of the node devices 100 and 100z according to the present invention. The embodiment (1) shows an operation example in the basic ring network arrangement and the ring topology table 70t shown in FIGS. 6A and 6B. FIG. 7A shows in more detail the network 200_2 shown in FIG. 6A. The network 200_2 is a ring network where the redundant node device 100z_21, the node devices 100_22 and 100_23, and the redundant node device 100z_24 are connected in this order, in a ring form. A client 400_1 is connected to the node device 100_23.

A ring topology table 70u of FIG. 7B is a table held in the node device 100_11 and is the same as the table 70t in FIG. 6B.

In FIGS. 7A and 7B, the node devices 100z_13 and 100z_15 are the redundant node devices (enable 72="ON"), their common address ="100z1", and operates as a redundancy type 73="1 (load balancing type)". Also, the priorities of the redundant node devices 100z_13 and 100z_15 are respectively "5" and "3" (see FIG. 7A). The other node devices 100_11, 100_12, 100_14 and 100_16 are non-redundant node devices (enable 72="0"), and no common address, redundancy type and priority are set thereto (not shown).

When the node devices 100 and 100z are both in a normal state, a topology message after the power on or reset is broadcast over the ring, and the node devices having received the topology message start to construct the ring topology table 70u.

The ring topology table 70u is constructed by the topology message distributed by the node devices 100 and 100z over the ring. Namely, the node devices 100 and 100z periodically broadcast over the ring the topology message for constructing the ring topology table. For the topology message, the source address of the RPR packet 700 is made the individual address of the node device itself, a broadcast address is stored in the destination address of the RPR packet, and the MAX value (=255) is stored in the TTL of the RPR packet to be broadcast over the ring.

Since the topology message is broadcast over the ring, the message is received by all of the node devices 100 and 100z on the ring. If the source address is not coincident with the individual addresses of the node devices themselves, and TTL value≠0 after decrementing the TTL value by 1, the node devices 100 and 100z having received the topology message again transmit the topology message over the ring. Since the initial value of the TTL=255, the node devices 100 and 100z having received the topology message check the TTL value of the packet, thereby calculating the number of hops to the position of the node indicating the source address of the packet. The node devices on the ring receive all of the topology messages transmitted by other node devices on the ring, and calculate a distance (hop number) to the position of the node device to construct the ring topology table.

Items of the ring topology table 70u in FIG. 7B will now be described.

Ring node addresses of the ring node devices 100 and 100z existing on the ring are stored in the node device address 71. The node addresses are taken out from the source address 740 of the topology message transmitted by the node devices 100 and 100z. In the arrangement of this link topology table 70u, the addresses of the node devices 100_11, 100_12, 100z_13, 100_14, 100z_15 and 100_16 are stored.

Hop numbers to the target node devices 100 and 100z are stored, with reference to the node device itself (the node device 100_11 in this case), in the east hop number 74 and the west hop number 75. This is calculated by the TTL of the topology message.

The east route selection 76 and the west route selection 77 are respectively for setting that the packet addressed to the ring node device is to be transmitted either a route in the east direction or the west direction.

In this case, the east route selection 76 and the west route selection 77 are set to take the shortest route to the ring node devices 100 and 100z, with reference to the east hop number and the west hop number. "ON" indicates a selection and "OFF" indicates a non-selection.

The node devices 100 and 100z periodically transmit/receive the topology message, and manage/maintain the ring topology table 70u, thereby enabling the topology state on the ring always to be grasped and a packet transfer according to a policy of the shortest route or the like to be performed.

The redundant node device 100z further starts the state transition operation of the load balancing type shown in FIG. 5B. Namely, after the power on or reset, the redundant node devices 100z_13 and 100z_15 assume the initial state ST10. The redundant links 300z_1 and 300z_2 at that time are in the blocking state. The redundant node devices 100z_13 and 100z_15 start the transmission of the keep alive message 700x (see FIG. 4). The node devices 100 and redundant node devices 100z having received the keep alive message 700x register the common address="100z1" of the table 70u, the redundancy node device enable 72 corresponding to the source address, and the redundancy type 73, and set the east hop number 74="6" and the west hop number 75="6" corresponding to the common address="100z1".

When being in the normal state, both of the redundant node devices 100z_13 and 100z_15 respectively transition to the working state (working system) according to the state transition of FIG. 5B, and make the redundant links 300z_1 and 300z_2 the forwarding state. Also, when the redundant node devices 100z_13 and 100z_15 respectively detect faults of the redundant node devices themselves, the redundant node devices transition to the protection state, and make the redundant links 300z_1 and 300z_2 the blocking state. Even in the blocking state in the initial state and the protection state, it is supposed that the redundant node devices 100z_13 and 100z_15 do not stop the transmission/reception of the control packet such as a topology message and a keep alive message.

In the redundant node device 100z_13, when the state of the device itself="working state", and the redundant state 785="working state" in the keep alive message 700x received from another (mate system) redundant node device 100z_15, it is recognized that a plurality of (two in this case) working redundant node devices including the node device itself exist on the ring 200_1, and performs forwarding processing of the load balancing type. Also, when the state of the redundant node device 100z_13 itself="working state", and the redundant state 785="protection state" in the keep alive message 700x received from the other redundant node device 100z_15, the redundant node device 100z_13 recognizes that the working redundant node device existing on the ring 200_1 is only the redundant node device 100z_13 itself, and performs the forwarding processing of the load balancing type of the working redundant node device number="1". In this case, a forwarding result of the redundant node device 100z_13 assumes the same forwarding processing as that of the non-load balancing type. Also, the redundant node device 100z_15 similarly selects the forwarding processing.

Hereinafter, the forwarding processing of the load balancing type will be described.

The redundant node devices 100z_13 and 100z_15 of the working state ST11 respectively forward the packets received from the redundant links 300z_1 and 300z_2 to the ring 200_1, and forward the packets received from the ring 200_1 to the redundant links 300z_1 and 300z_2. However, whether or not the forwarding is performed is determined by e.g. an address area of the packet. Namely, the redundant node devices 100z_13 and 100z_15 perform hash operation of the address area of the received packet, and determines whether or not the packet is forwarded based on the operation result.

It is to be noted that while the hash operation is performed to the address area of the received packet in this embodiment, any processing is adopted as long as a single redundant node device forwards the same packet received by a plurality of redundant node devices, so that the operation may be performed to a target other than the address area of the received packet.

Also, an operation method of the hash operation is not questioned. For example, the address area of the packet may be divided by a preset operator and by referring to a remainder value thereof, whether or not the packet is forwarded may be determined.

Namely, each redundant node device 100z can recognize the working redundant node device number=N (N=2 in FIGS. 7A and 7B), and an order of priority (determined by priority) on the ring 200_1 based on the keep alive message 700x received from each redundant node device 100z. Therefore, each working redundant node device 100z selects an operator by which the remainder value assumes the maximum "N−1 (in FIG. 7B,="1")" for N, performs the hash operation of the address area of the received packet, and obtains the remainder value. When this remainder value is coincident with the remainder value allocated to a plurality of respective working redundant node devices not to be overlapped, e.g. the order of priority of the device itself, the packet is forwarded and otherwise, the packet is not forwarded.

This packet is forwarded by the redundant node device of the mate system whose remainder value and order of priority are mutually coincident. For example, in the ring 200_1 of FIG. 7A, the order of priorities of the redundant node devices 100z_13 and 100z_15 are respectively set to "0" and "1" from the priority="5" and "3". Then, the operator whose remainder value="maximum 1", namely the operator whose remainder value is 0 or 1 is selected, the packet whose operation result of the address area="0" is forwarded by the redundant node device 100z_13 and is not forwarded by the redundant node device 100z_15. On the other hand, the packet whose operation result="1" is forwarded by the redundant node device 100z_15 and is not forwarded by the redundant node device 100z_13. Thus, the same packet is prevented from being forwarded redundantly, so that load balancing of the packet forwarding can be performed.

When a fault occurs in the redundant node device 100z, the redundant node device 100z shifts the state of the redundant node device 100z itself to the protection state ST12, and notifies to another (mate system) redundant node device 100z with the keep alive message 700x that the redundant node device 100z itself is in a protection state (protection system), i.e. a fault has occurred. The other (mate system) working state (working system) redundant node device 100z having received the keep alive message 700x recognizes the change of the number of working redundant node devices 100z, newly determines the operator of the hash operation and the order of priority, and determines whether or not the packet is forwarded based on the operator and the order of priority.

It is to be noted that when two redundant node devices exist as in this embodiment, and a fault has occurred in e.g. the redundant node device 100z_13, the redundant node device 100z_15 may forward all of the packets received from the redundant link 300z_1 and the hash operation is not required since only the redundant node device 100z_15 is working.

This corresponds to the forwarding processing of the non-load balancing type mentioned above. Also, when forwarding the packets received from the redundant links 300z_1 and 300z_2 to the ring 200_1, the redundant node devices 100z_13 and 100z_15 respectively set, not individual addresses of the devices themselves, the common address="100z1" for the redundant node device in the source address 740 of the RPR packet (see FIG. 21) header. The node devices 100 and 100z having received the RPR packet from the redundant node devices 100z_13 and 100z_15 register by a normal operation the MAC address of the client 400_1 stored in the RPR packet and the source address 740 of the RPR packet header in the MAC tables of the node devices 100 and 100z themselves. Thus, it becomes unnecessary for the node devices 100 and 100z to be aware that the redundant node devices 100z_13 and 100z_15 are redundant node devices and the packet is transmitted from either the redundant node device 100z_13 or 100z_15.

Hereinafter, the operation in a case where the node device 100_11 in FIG. 7A receives a packet addressed to the client 400_1 from outside (non-redundant link 300 of FIG. 3) will be described. The node device 100_11 has already received the packet from the client 400_1 through e.g. the redundant node device 100z_13 selected as a result of the hash operation. It is supposed that the MAC address of the client 400_1 and the common address of the redundant node device 100z_13 as the address of the node device to which the packet is to be transferred are registered in the MAC address.

The node device 100_11 retrieves the MAC address 400_1 in the MAC table of the node device itself, and reads the MAC address="400_1" and the address of the destination node device corresponding thereto="100z1", since the MAC address has already been learned. By referring to the ring topology table 70u with the common address="100z1", the east route selection 76="ON" and the west route selection 77="OFF" are read. The node device 100_11 transmits the RPR packet 700 (see FIG. 21) with the destination address 730="100z1" of the RPR header, source address 740="100_11", and TTL 710="255 (maximum value)" in the east direction.

The node devices 100 and 100z having received the RPR packet 700 capture the packet when the destination address 730="100z1" of the RPR packet 700 is coincident with their own address including the common address, and allow the packet to be passed to the subsequent node device. Otherwise, the RPR packet 700 is passed there through. Namely, the packet received from the west side is transferred to the east side. At this time, the node devices 100 and 100z decrement the value of TTL 710 of the packet 700 by 1. As a result, the RPR packet 700 is captured by the redundant node devices 100z_13 and 100z_15, and is returned to the node device 100_11 which have transmitted the RPR packet 700. The node device 100_11 deletes the RPR packet 700 whose source is the node device itself from the ring 200_1.

It is to be noted that the node device 100_11 may set the east hop number 74 (=west hop number 75)="6" of the common address="100z1" in the ring topology table 70u in the TTL 710 of the RPR packet 700. Thus, the node device 100_11 has only to perform deleting the packet 700 whose TTL 710 value="0", so that it is not required to compare the source address with the address of the node device 100_11.

On the other hand, the redundant node devices 100z_13 and 100z_15 having received the packet 700 respectively perform the hash operation of the address area of the RPR packet 700, determines whether or not the packet 700 is forwarded to the redundant links 300z_1 and 300z_2, and is forwarded either of the redundant node devices. As a result, the packet addressed to the client 400_1 received by the node device 100_11 reaches the client 400_1 through the redundant link 300z_1 and the node devices 100_22, 100_23.

By the above-mentioned operation, it is not required for the non-redundant node devices 100_11, 100_12, 100_14 and 100_16 to be aware of the redundancy type and redundant state of the redundant node device 100z on the ring 200_1. Also, the node device 100 may transmit the packet 700 by using the common address 100z1 learned from the MAC table, even after the state of the redundant node device 100z transitions. The redundant node devices 100z_13 and 100z_15 having received the packet 700 have only to perform the forwarding or blocking of the packet as a result of the hash operation.

Operational Embodiment (2)

Figure 8:
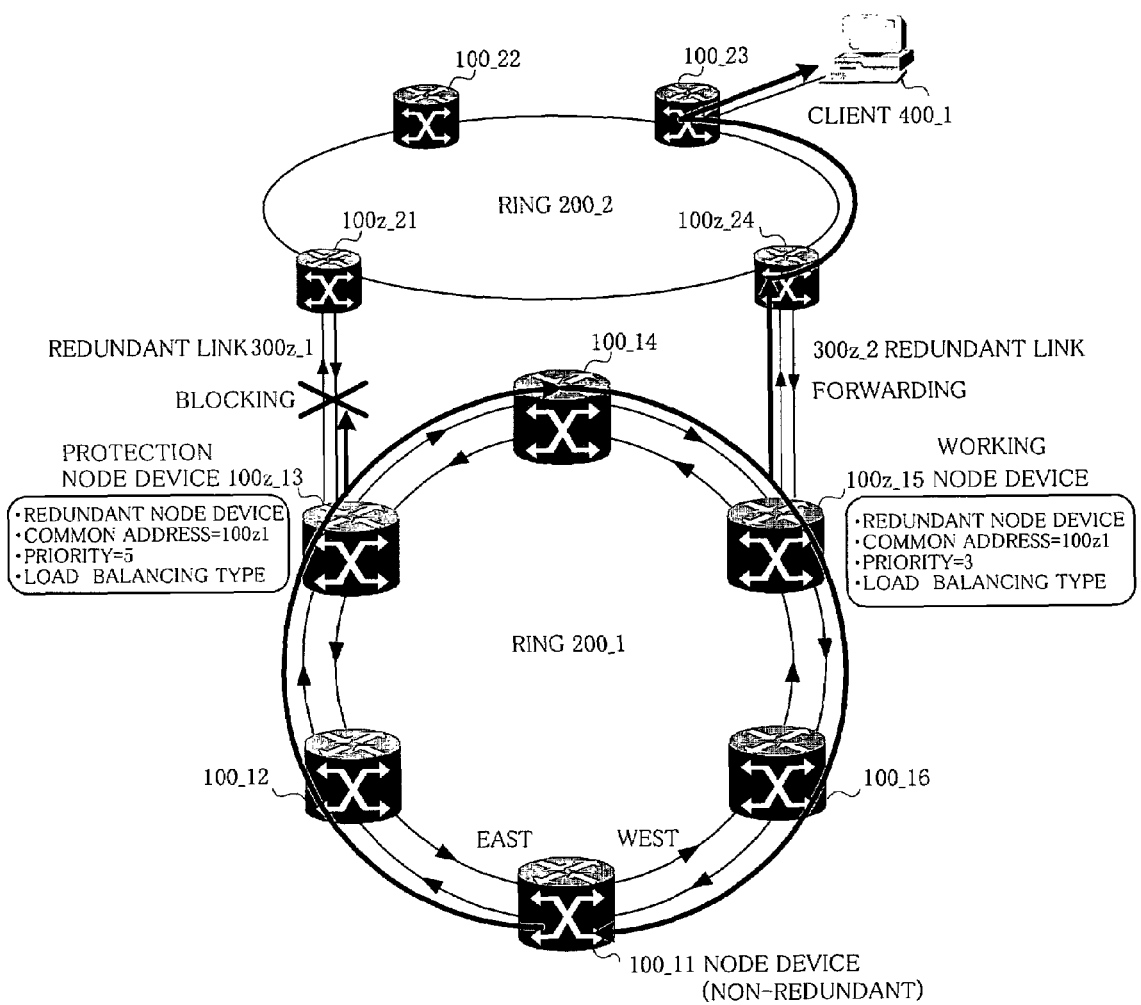
FIG. 8 is a diagram showing an operational embodiment (2) of a node device according to the present invention.

FIG. 8 shows an operational embodiment (2) of the present invention, indicating a case where a fault occurs in the redundant node device 100z_13 and the state thereof transitions to the "protection state".

In the same way as the embodiment (1), it is supposed that the node device 100_11 has already received the packet from the client 400_1, and the address of the client 400_1 and the common address of the redundant node device 100z_13 are registered in the MAC table.

The node device 100_11 transmits the packet (destination address 730="100z1: common address") 700 addressed to the client 400_1 in the east direction. This packet 700 is received by the redundant node devices 100z_13 and 100z_15. While the packet is blocked by the redundant node device 100z_13, the packet is forwarded by the redundant node device 100z_15 to be transmitted to the client 400_1 through the redundant link 300z_2, the redundant node device 100z_24 and the node device 100_23.

As mentioned in the operational embodiments (1) and (2), the node device 100 and the redundant node device 100z of the present invention enable a plurality of working state (working system) redundant node devices 100z to be simultaneously arranged on the ring 200, and the load balancing processing of the packets at the plurality of redundant node devices 100z to be performed, thereby improving the throughput of packet. Also, by mutually notifying the redundant state between the redundant node devices 100z, it becomes possible to accurately grasp the working state redundant node devices 100z on the ring 200, and to perform high-speed, reliable and dynamic load balancing processing.

Operational Embodiment (3)

Figures 9A, 9B:
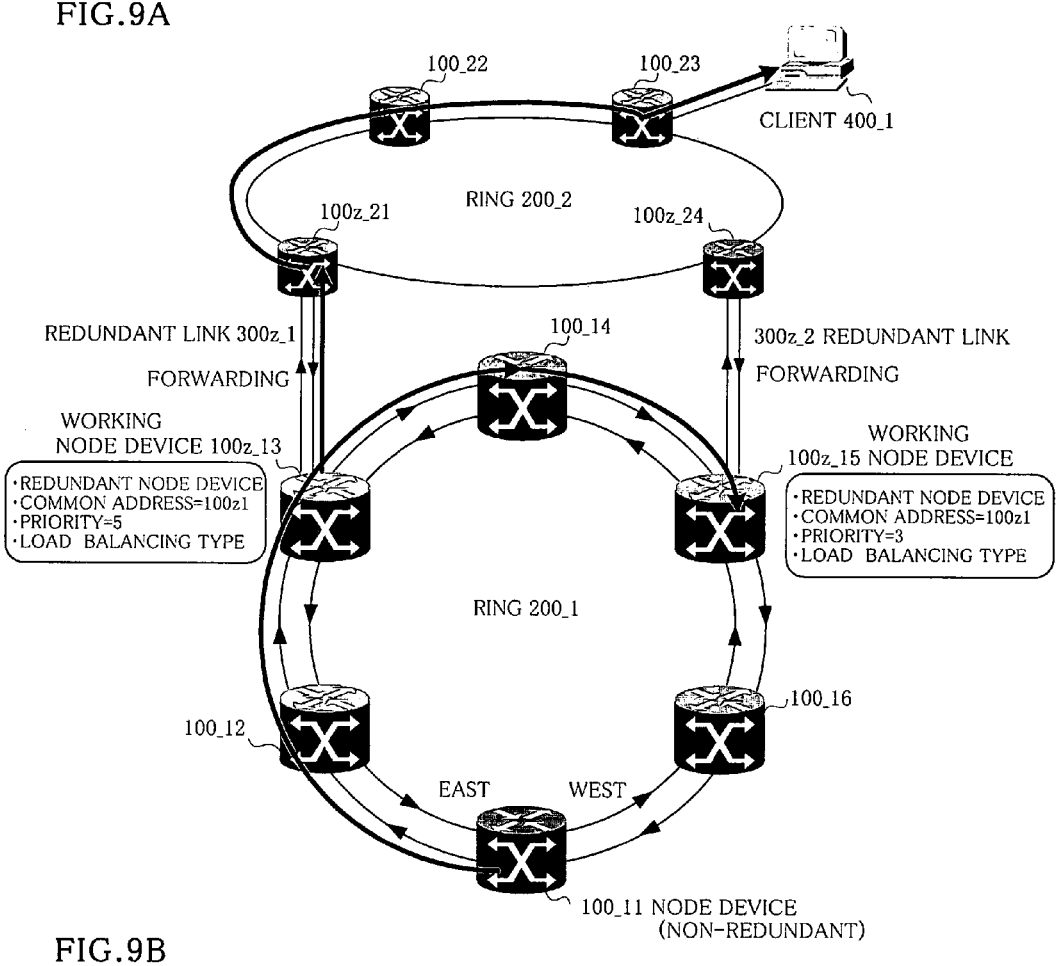
FIGS. 9A and 9B are diagrams showing an operational embodiment (3) of a node device according to the present invention.

FIGS. 9A and 9B show an operational embodiment (3) of the present invention. In the embodiments (1) and (2), the RPR packet 700 transmitted from the node device 100_11 is deleted at the time when the packet goes around the ring 200_1 and returns to the node device 100_11. However, the packet 700 has only to be transmitted to the redundant node devices 100z_13 and 100z_15 of the common address, and it is not required to be further transmitted to the node device 100_16 and to be returned to the node device 100_11. The available bandwidth of the ring between the redundant node device 100z_15—the node device 100_16—the node device 100_11 deteriorates. This embodiment (3) improves the available bandwidth of this section.

FIG. 9A shows a network example, which is the same as that of the embodiment (1). FIG. 9B shows a ring topology table 70y of the node device 100_11. This table 70y is different from the table 70t of the embodiment (1) in values of the east hop number 74 and west hop number 75 of the common address="100z1". Namely, the values of the east hop number 74 and the west hop number 75 are respectively the hop number="4" from the node device 100_11 to the farthest redundant node device 100z_15 in the east direction and the hop number="4" to the farthest redundant node device 100z_13 in the west direction (see hatched portion). Also, since the hop numbers of the east route selection 76 and the west route selection 77 are mutually the same in FIG. 9B, either route may be selected. However, the east route selection 76 is set with "ON" and the west route selection 77 is set with "OFF" tentatively.

When transmitting the RPR packet 700, the node device 100_11 sets the value of the TTL 710 of the packet to the east hop number 74="4" of the east route selection 76="ON". Thus, the packet 700 transmitted from the east direction is deleted by the redundant node device 100z_5, so that it is not transmitted between the redundant node device 100z_15—the node device 100_16—the node device 100_11. Thus, an unnecessary packet transmission is eliminated and the available bandwidth of the ring can be improved.

Operational Embodiment (4)

Figures 10A, 10B:
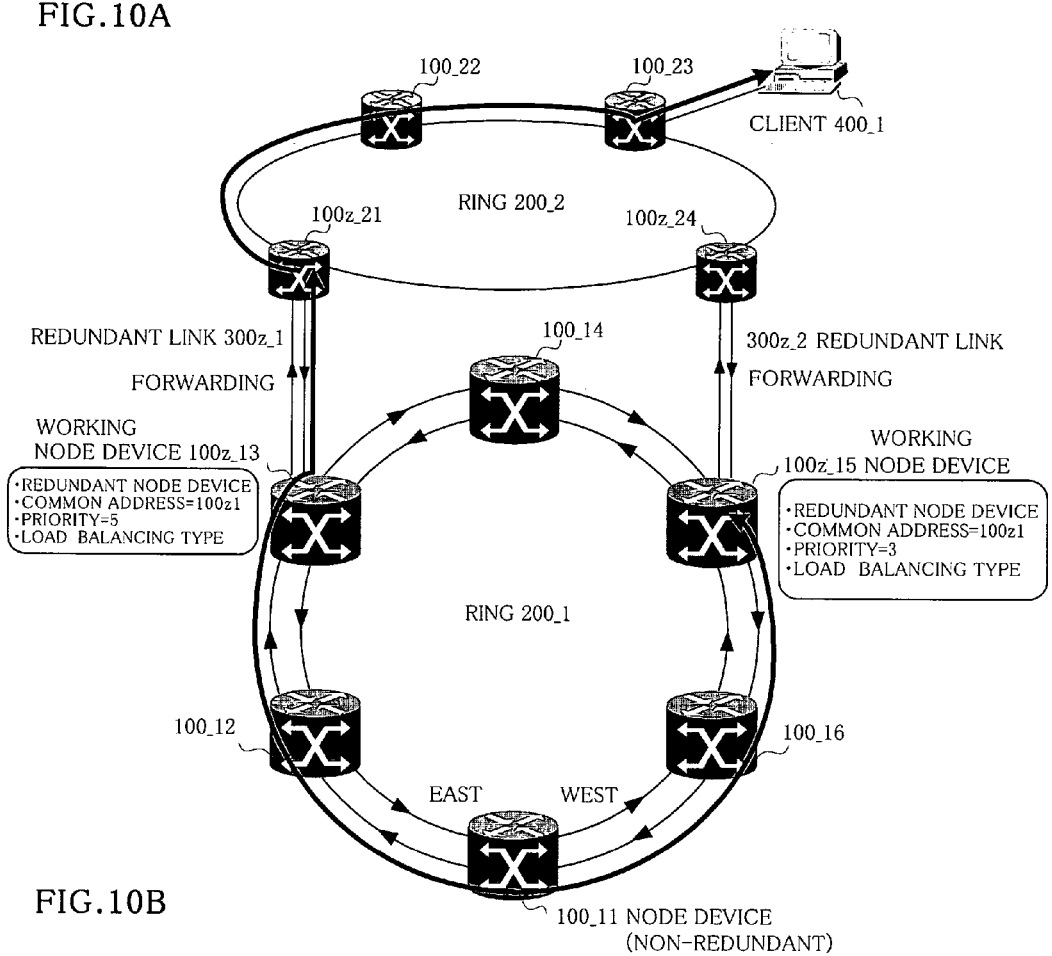
FIGS. 10A and 10B are diagrams showing an operational embodiment (4) of a node device according to the present invention.

FIGS. 10A and 10B show an embodiment (4) of the present invention. While the transmission direction of the packet addressed to the redundant node device 100z is fixed to one direction (east direction) in the embodiment (3), the packet can be transmitted in both directions by the node device 100_11 in the embodiment (4), so that the available bandwidth of the ring 200_1 can be improved.

The network shown in FIG. 10A is the same as that of the embodiment (3). A ring topology table 70w of FIG. 10B is different from the ring topology table 70v of the embodiment (3) in the setting of the east hop number 74, the west hop number 75, the east route selection 76 and west route selection 77 of the common address="100z1". Namely, the hop numbers="2" to the redundant node devices 100z_13 and 100z_15 in the east direction and the west direction is set to both of the east hop number 74 and the west hop number 75 respectively, and "ON" is set to both of the east route selection 76 and the west route selection 77.

It is to be noted that this example shows a case where the number of redundant node devices="2". When the number of redundant node devices is equal to or more than "3", the redundant node devices are divided into two groups; one group of receiving packets from the east direction and the other group of receiving packets from the west direction, and the hop numbers to the farthest redundant node device within the group are respectively made the values of the east hop number 74 and the west hop number 75.

In such settings, the node device 100_11 copies the RPR packet 700, transmits an RPR packet 700_1 (not shown) of the value of the TTL 710="2" (=east hop number 74)" in the east direction, and transmits an RPR packet 700_2 (not shown) of the value of the TTL 710="2 (=west hop number 75)" in the west direction.

Although the RPR packets 700_1 and 700_2 respectively reach the redundant node devices 100z_13 and 100z_15, they are not passed through by the redundant node devices 100z_13 and 100z_15. Therefore, the RPR packets 700_1 and 700_2 are not distributed over the ring between the redundant node device 100z_13—the node device 100_14—the redundant node device 100z_15. Thus, the available bandwidth of the ring 200_1 can be improved.

It is to be noted that the node devices 100 and 100z can select the settings of the topology table shown in embodiments (2)-(4) so as to be optimum for the improvement of the available bandwidth based on the arrangement of the ring 200_1 and the ring state collected by the topology message. Namely, which system of the embodiments (2)-(4) improves the bandwidth efficiency in the ring 200_1 depends on the node device on the transmission side by the node device number on the ring 200_1, the arrangement position of the redundant node device, the hop numbers up to the redundant node devices with reference to the node devices as base point. Therefore, the node devices select any of the system of embodiments (2)-(4) in order to improve the bandwidth efficiency.

For example, in the embodiment (1), the efficiency of the ring 200_1 becomes better when the node device 100_12 uses the system of the embodiment (3), and transmits the packet of TTL="3" by the east route. On the other hand, the efficiency of the ring 200_1 becomes better when the node device 100_14 uses the system of the embodiment (4) and transmits the packet of the TTL="1" bidirectionally to the east route and the west route.

Operational Embodiment (5)

FIGS. 11A and 11B show an embodiment (5) of the present invention. While a single network is connected to the ring 200_1 with the redundant node device 100z in the embodiments (1)-(4), a plurality of networks are connectable thereto by mounting a plurality of redundancy groups (group of redundant node devices of mate system) in this embodiment (5).

In FIG. 11A, the ring 200_1 is composed of the node devices 100_10-100_12, the redundant node devices 100z_13 and 100z_14, node devices 100_15-100_17, the redundant node devices 100z_18 and 100z_19 connected like a ring. Among these, the redundant node devices 100z_13 and 100z_14 and the redundant node devices 100z_18 and 100z_19 are respectively connected to the redundant node devices 100z_21 and 100z_22 of the ring 200_2 and redundant node devices 100z_31 and 100z_32 of a ring 200_3 with the redundant links 300z_1-300z_4. Thus, the ring 200_1 is connected to the rings 200_2 and 200_3.

FIG. 11B shows a ring topology table 70x held in the node device 100_11. This table 70x is different from the table 70v shown in the operational embodiment (3) in that a redundant node device group ID (identifier) 78 (see hatched portion) is added, and a common address="100z2" (see hatched portion) is added to the node device address 71. Namely, in FIG. 11B, "1" and "2" are respectively set as the group ID 78 of the redundant node devices 100z_13, 100z_14, and the redundant node devices 100z_18, 100z_19. "100z1" and "100z2" are respectively set as the common addresses of the redundant node devices 100z_13, 100z_14, and the redundant node devices 100z_18, 100z_19.

In the same way as the embodiment (3), "ON" and "OFF" are set to the east route selection 76 and the west route selection 77 of the common address 100z1 by selecting a shorter route in the "east" direction from among the east hop number 74="3" to the farthest redundant node device and the west hop number="8". Similarly, "OFF" and "ON" are respectively set to the east route selection 76 and the west route selection 77 of the common address 100z2.

Also, a redundant node device group ID (not shown) is newly added to the PDU 780 (see FIG. 4) of the keep alive packet 700x. This group ID is set upon a startup and a reset of the node device 100z in the same way as the other parameters. Thus, it becomes possible for the node devices 100 and 100z to recognize a group to which the redundant node device 100z belong. It is to be noted that since the common address 784 of the packet 700x depends on a group, the redundancy group can be recognized based on the common address 784. In this case, a group ID is not required for the keep alive packet 700x. In order to prepare a topology table with a higher reliability, a group ID field is added to the keep alive packet 700x.

Thus, it becomes possible to connect the ring 200_1 to a plurality of networks (rings 200_2 and 200_3 in FIG. 11A) with a plurality of redundant node devices per network.

Operational Embodiment (6)

Figures 12A, 12B:
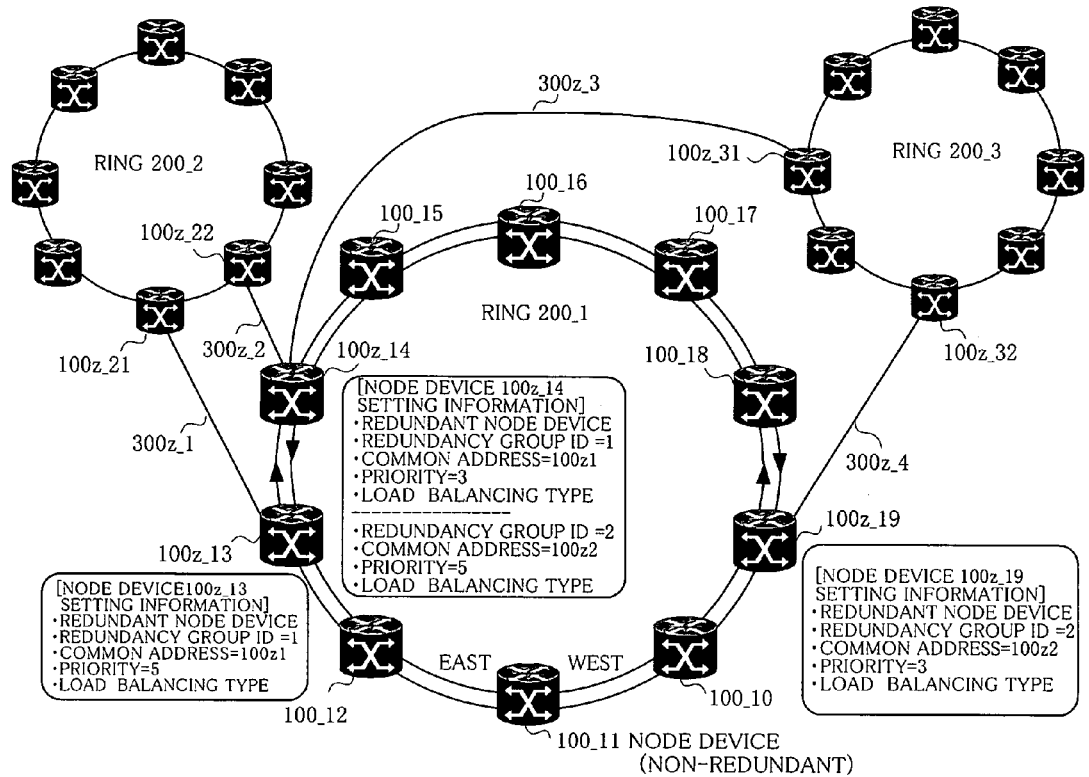
FIGS. 12A and 12B are diagrams showing an operational embodiment (6) of a node device according to the present invention.

FIGS. 12A and 12B show an operational embodiment (6) of the present invention. This embodiment (6) enables a single redundant node device 100z to belong to a plurality of redundancy groups. Namely, it is made possible to connect a plurality of networks through a single redundant node device 100z.

The ring network example shown in FIG. 12A is different from that of the embodiment (5) shown in FIG. 11A in that the redundant node device 100z_18 of FIG. 11A becomes a non-redundant node device 100_18, and the redundant node device 100z_14 instead of the redundant node device 100z_18 is connected to the redundant node device 100z_31 of the ring 200_3 with the link 300z_3. Namely, the redundant node device 100z_14 connects the ring 200_1 to the rings 200_2 and 200_3.

Also, a ring topology table 70y held in the node device 100_11 shown in FIG. 12B is different from the table 70x of the embodiment (5) in that the redundant node device group IDs 78="1" and "2" (see hatched portion) of the redundant node device address 71="100z_14" are set, the redundant node device address 71="100z_18" is changed to "100_18", and the redundant node device enable 72="OFF" and the redundant type 73="0" (see hatched portion) are set for the redundant node device address 71="100_18". Namely, the redundant node devices 100z_13 and 100z_14 are arranged as the group ID="1", and the redundant node devices 100z_14 and 100z_19 are arranged as the group ID="2".

In FIG. 12A, since the redundant node device 100z_14 belongs to both of the redundancy group IDs="1" and "2", the following couple of setting information (1) and (2) are individually set in the redundant node device 100z_14.

Setting information (1): Redundancy group ID="1", common address="100z1", priority="3", and redundancy type="load balancing type"

Setting information (2): Redundancy group ID="2", common address="100z2", priority="5", and redundancy type="load balancing type"

It is to be noted that the redundant node device 100z_14 can operate as a working system or a protection system independently in the redundancy group ID "1" and the redundancy group ID="2".

Also, in this operational embodiment (6), information concerning a plurality of redundancy groups can be stored in the PDU 780 (see FIG. 4) of the keep alive packet 700x. The redundant node device 100z_14 broadcasts and distributes, over the ring 200_1, the keep alive packet 700x storing therein the information concerning both of the redundancy group IDs="1" and "2". Thus, it becomes possible for the node devices 100 and 100z to prepare the ring topology table 70y the same as that of FIG. 12B.

Operational Embodiment (7)

Figure 13A:
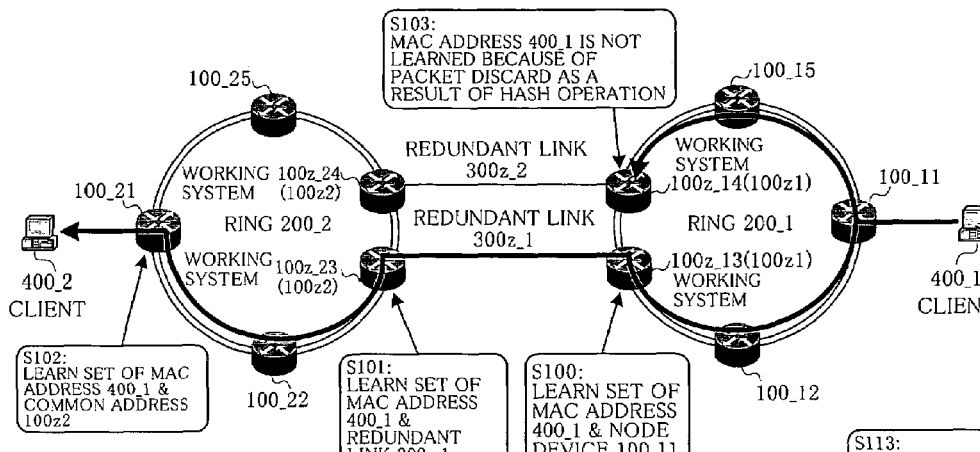
FIGS. 13A-13C are diagrams showing an operational embodiment (7) of a node device according to the present invention.
Figure 13B:
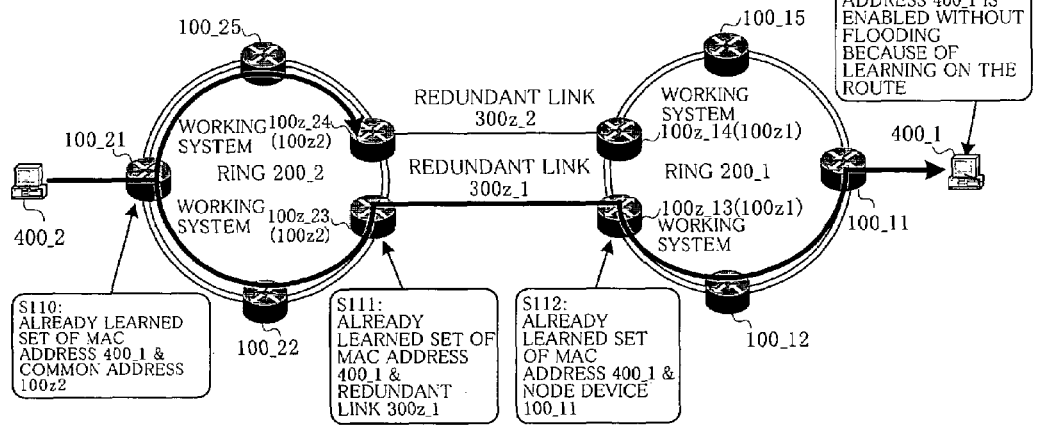
Figure 13C:
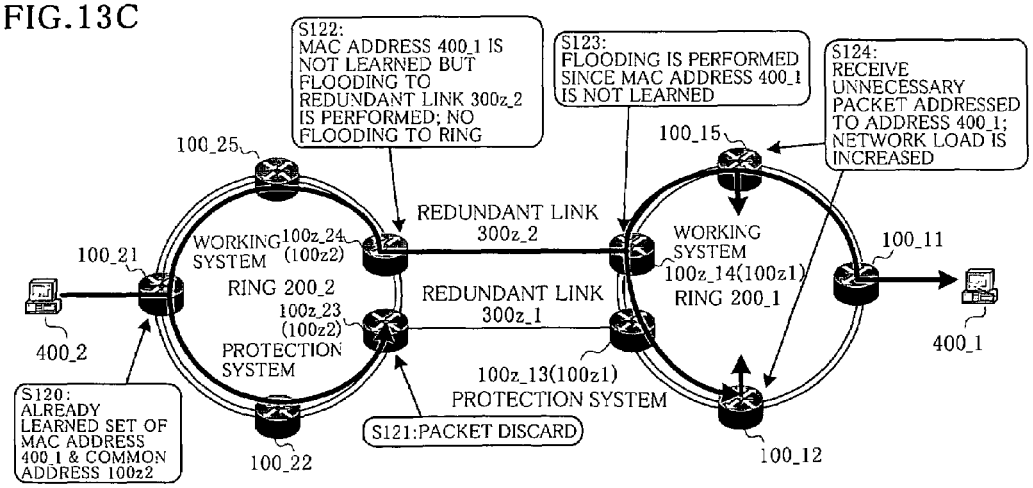

FIGS. 13A-13C show an operational embodiment (7) of the present invention. This embodiment (7) is the same as that of the embodiment (4) shown in FIGS. 10A and 10B. However, this embodiment (7) specifically shows a packet transmission/reception operation between the client 400_1 connected to the node device 100_11 on the ring 200_1 and a client 400_2 connected to the node device 100_21 on the ring 200_2.

In FIG. 13A, the node devices 100_15, 100_11 and 100_12, and the redundant node devices 100z_13 and 100z_14 are connected in this order to compose the ring 200_1. The node devices 100_25, 100_21 and 100_22, and redundant node devices 100z_23 and 100z_24 are connected in this order to compose the ring 200_2. The redundant node devices 100z_13 and 100z_14 are connected to the redundant node devices 100z_23 and 100z_24 with the redundant links 300_1 and 300_2, whereby the ring 200_1 and the ring 200_2 are mutually connected. The common address of the redundant node devices 100z_13 and 100z_14 is set to "100z1", and the common address of the redundant node devices 100z_23 and 100z_24 is set to "100z2".

Hereinafter, the packet transmission operation from the client 400_1 to the client 400_2 in this network composition will be described.

Step S100: The packet transmitted from the client 400_1 is flooded by the node device 100_11 to be transmitted to the redundant node device 100z_13 through the node device 100_12. The redundant node device 100z_13 learns a set of the MAC address="400_1" of the client 400_1 and the address="100_11" of the node device 100_11. Furthermore, the redundant node device 100z_13 transmits the packet to the redundant link 300z_1 as a result of the hash operation.

Step S101: The redundant node device 100z_23 receives the packet from the redundant link 300z_1, and learns a set of the MAC address="400_1" and the redundant link 300z_1. Furthermore, the redundant node device 100z_23 transmits the packet to the ring 200_2.

Step S102: The node device 100_21 receives the packet, and learns a set of MAC address="400__1" and the common address="100z2" of the redundant node device 100z_23. Furthermore, the redundant node device 100_21 transmits the packet to the destination client 400_2.

FIG. 13B shows a case where the client 400_2 transmits the packet addressed to the 400_1 in the network of FIG. 13A. Hereinafter, the transmission operation will be described.

Step S110: The node device 100_21 transmits the packet received from the client 400_2 to the both direction of east and west with the learned common address="100z2". The redundant node device 100z_24 discards the packet as a result of the hash operation.

Step S111: As a result of the hash operation, the redundant node device 100z_23 transmits the received packet to the learned redundant link 300z_1.

Step S112 and S113: The redundant node device 100z_13 transmits the received packet to the learned node device 100_11, which transmits the packet to the client 400_1.

Thus, the packet is transmitted from the client 400_2 to the client 400_1.

FIG. 13C shows a case where e.g. a fault occurs in the redundant node device 100z_23 and the redundant node device 100z_23 in FIG. 13B is switched over from the working system to the protection system. Hereinafter, a transmission operation in a case where the client 400_2 transmits the packet addressed to the client 400_1 at this time will be described.

Steps S120 and S121: The node device 100_21 transmits the packet to the common address="100z2" bidirectionally, in the same way as the above-mentioned step S110. The protection redundant node device 100z_23 discards the received packet.

Step S122: Although having not learned the MAC address 400_1 of the packet received, the redundant node device 100z_24 transmits the packet received with the common address to the redundant link 300z_2 without flooding to the ring 200_2.

Steps S123 and S124: Since the destination MAC address="400__1" of the received packet has not been learned, the redundant node device 100z_14 floods the packet to the ring 200_1. Thus, the packet is received by the node devices 100_12, 100_15 and 100_11. The packet is not captured by the node devices 100_12 and 100_15 to be transmitted to the client 400_1 through the node device 100_11. Thus, the flooding of the packet occurs in the ring 200_1 and a utilization ratio of bandwidth in the ring deteriorates. The method of avoiding this flooding will now be described by the following operational embodiment (8).

Operational Embodiment (8)

Figure 14A:
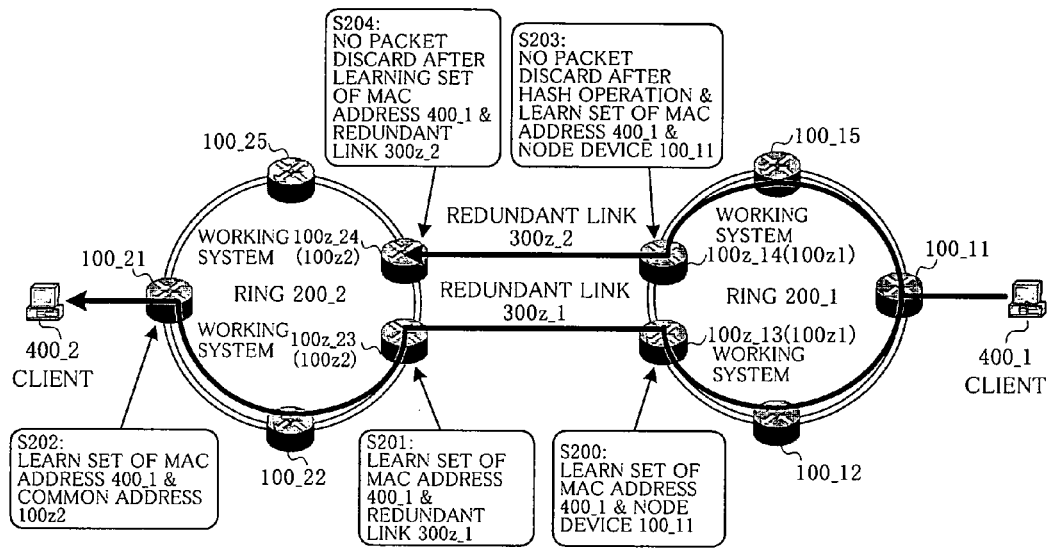
FIGS. 14A and 14B are diagrams showing an operational embodiment (8) of a node device according to the present invention.
Figure 14B:
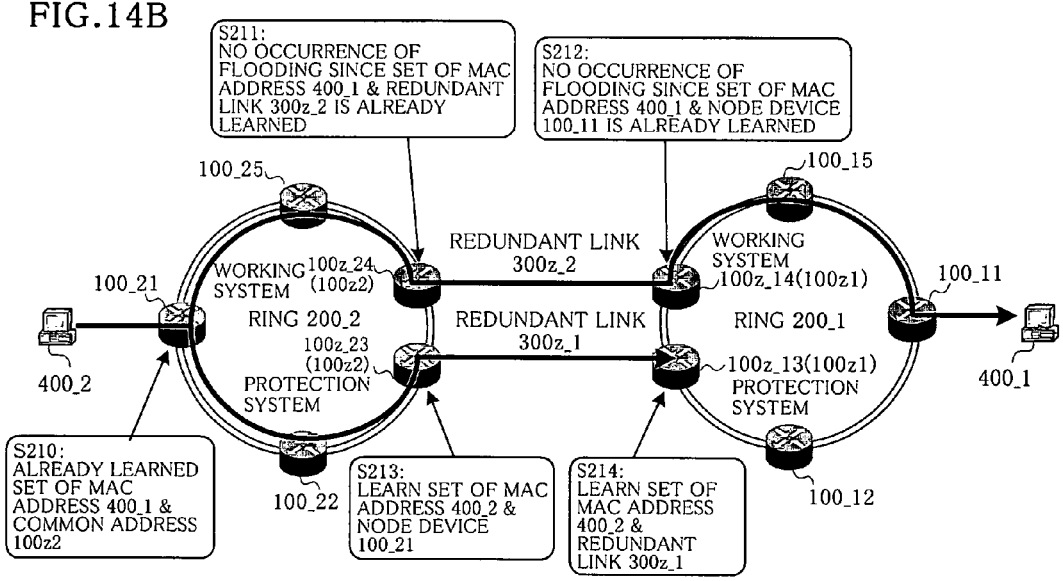

FIGS. 14A and 14B show an operational embodiment (8) of the present invention. This embodiment (8) shows an operation of avoiding the flooding which occurs upon switchover of the redundant node device of the embodiment (7). Hereinafter, this operation will be described.

FIG. 14A shows a case where the client 400_1 transmits the packet addressed to the client 400_2.

Steps S200-S202: In the same way as steps S100-S102 of the embodiment (7), the packet transmitted by the client 400_1 is learned by the redundant node devices 100z_13, 100z_23 and the node device 100_21 to reach the client 400_2.

Step S203: On the other hand, the redundant node device 100z_14 learns a set of the MAC address="400__1" of the client 400_1 and the address="100__11" of the node device 100_11 without discarding the packet received from the node device 100_11 after the hash operation. Furthermore, the node device 100z_14 transmits the packet to the redundant link 300z_2.

Step S204: The redundant node device 100z_24 having received the packet learns the set of the MAC address="400__1" and the redundant link 300z_2, and then discards the packet.

FIG. 14B shows a case where the client 400_2 transmits the packet addressed to the client 400_1 after the redundant node device 100z_23 is switched over to the protection system.

Steps S210 and S213: The node device 100_21 transmits the packet from the client 400_2 to the learned common address="100z2".

Step S211: The redundant node device 100z_24 transmits the packet to the learned redundant link 300z_2 and floods no packet over the ring 200_2.

Step S212: The redundant node device 100z_14 transfers the packet to the learned node device 100_11, and floods no packet over the ring 200_1.

Thus, the flooding of step S123 shown in the embodiment (7) of FIG. 13C does not occur, so that deterioration of the utilization ratio of bandwidth in the ring 200_1 is avoided.

Step S213: On the other hand, the protection redundant node device 100z_23 learns a set of the MAC address="400__2" of the client 400_2 and the address="100__21" of the node device 100_21 based on the received packet, and then transmits the packet to the redundant link 300z_1 without discarding the packet.

Step S214: The redundant node device 100z_13 receives the packet, learns a set of the MAC address="400__2" and "redundant link 300z__1", and then discards the packet.

These steps S213 and S214 respectively correspond to the above-mentioned steps S203 and S204. Thus, the protection redundant node device 100z learns the packet, thereby enabling avoidance of a load increase by flooding caused by not having learned a packet after a switchover of a working system.

Operational Embodiment (9)

Figure 15A:
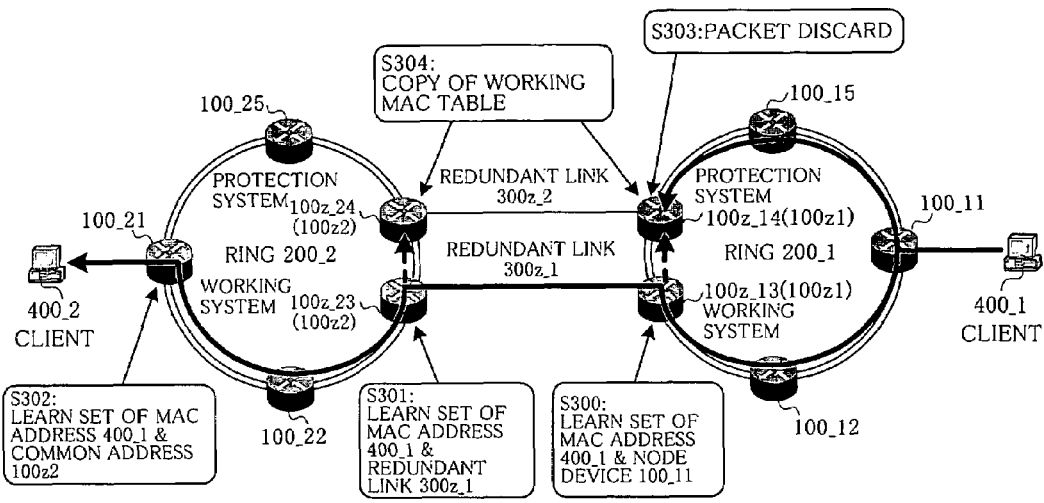
FIGS. 15A and 15B are diagrams showing an operational embodiment (9) of a node device according to the present invention.
Figure 15B:
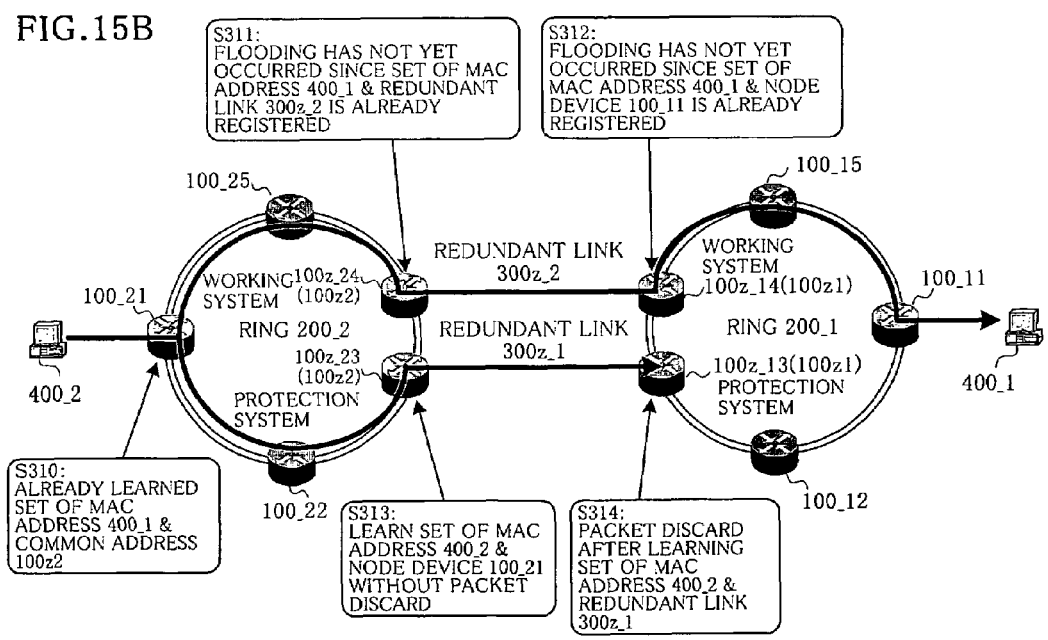

FIGS. 15A and 15B show an operational embodiment (9) of the present invention. In the embodiment (8), even in the redundant route where a packet reception becomes unnecessary by the protection route and a hash operation result, MAC table is autonomously learned by capturing and transmitting packets. In this embodiment (9), the protection redundant node device 100z and the redundant node device 100z where the packet reception becomes unnecessary discard packets and do not learn autonomously. Alternatively, the redundant node device 100z receives the contents of the MAC table learned from the working redundant node device 100z and the redundant node device 100z having received the packet as a result of the hash operation. Thus, the contents of the MAC table of the redundant node device 100z which does not receive the packet are synchronized with the contents of the MAC table of the redundant node device 100z which has received the packet. This operation will now be described.

FIG. 15A shows the same network as that shown in the embodiment (8). In this network, the redundant node devices 100z_13 and 100z_23 are in the working system and the redundant node devices 100z_14 and 100z_24 are in the protection system.

Steps S300-S302: The client 400_1 transmits the packet addressed to the 400_2. The packet is transmitted to the client 400_2 through the redundant node devices 100z_13 and 100z_23, and the node device 100_21, in the same way as steps S200-S202 of the operational embodiment (8). The redundant node devices 100z_13 and 100z_23, and the node device 100_21 learn a route from the MAC table.

Step S303: On the other hand, the protection redundant node device 100z_14 discards the packet received from the node device 100_11.

Step S304: The protection redundant node devices 100z_14 and 100z_24 respectively copy the contents of the MAC table learned by the working redundant node devices 100z_13 and 100z 23. It is to be noted that the redundant node device 100z_24 converts the redundant link 300z_1 of the MAC table into the redundant link 300z_2 at this time.

FIG. 15B shows a network where the redundant node devices 100z_13 and 100z_23 are switched over from the working system to the protection system, and the redundant node devices 100z_14 and 100z_24 are switched over from the protection system to the working system. The packet transmission operation in a case where the client 400_2 transmits the packet addressed to the client 400_1 in this state will now be described.

Step S310: The node device 100_21 transmits the packet received from the client 400_2 to the common address="100z2" bidirectionally.

Step S311: The redundant node device 100z_24 transmits the received packet to the redundant link 300z_2 by referring to the MAC table copied.

Step S312: The redundant node device 100z_14 transmits the received packet to the node device 100_11 by referring to the MAC table copied. Thus, the packet is transmitted to the client 400_1.

Steps S313 and S314: The redundant node devices 100z_23 and 100z_13 respectively execute the same operation as the steps S203 and S204 of the embodiment (8) to learn the route in the MAC table.

Operational Embodiment (10)

Figure 16A:
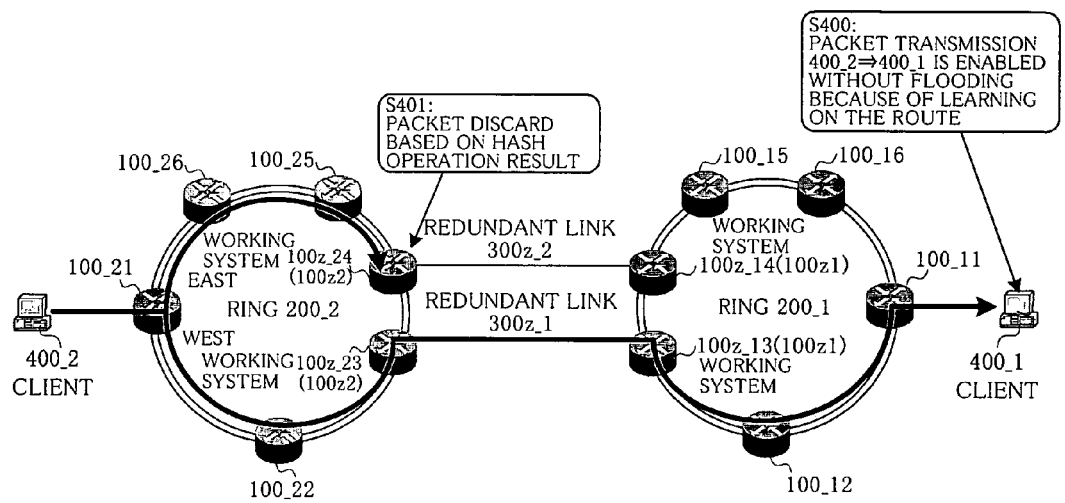
FIGS. 16A and 16B are diagrams showing an operational embodiment (10) of a node device according to the present invention.
Figure 16B:
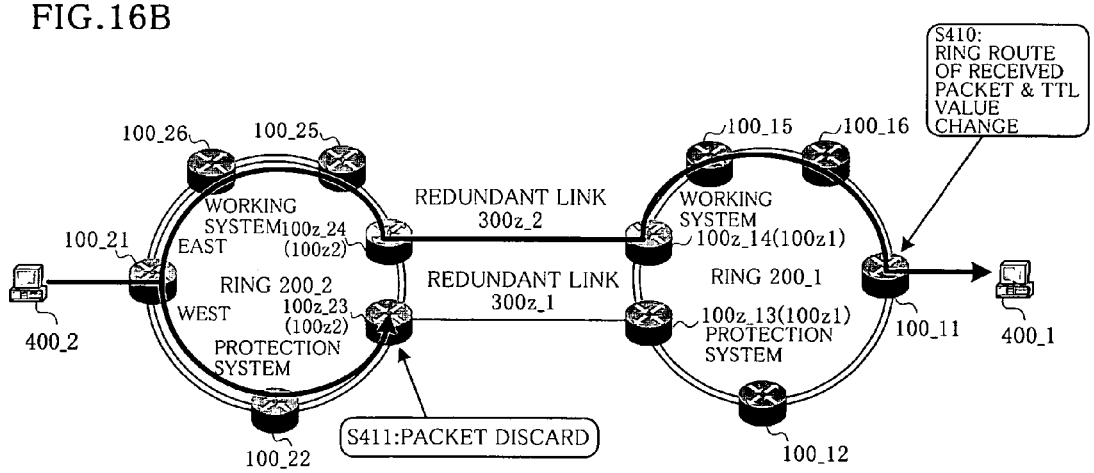

FIGS. 16A and 16B show an operational embodiment (10) of the present invention. Since the packet transmission route before the switchover of the redundant node device 100z is different from that after the switchover, problems of a packet double reception and a reverse of a packet reception order occur on the reception side. In this embodiment (10), this problem is avoided by not receiving packet for a fixed time.

Hereinafter, the operation example will be described. FIG. 16A shows a network where the rings 200_1 and 200_2 are connected with the redundant node device in the same way as the network shown in the embodiment (9). This network is different from that of the embodiment (9) in that the node device 100_16 is inserted between the node devices 100_11 and 100_15, and the node device 100_26 is inserted between the node devices 100_21 and 100_25.

Firstly, the case where the packet addressed to the client 400_1 is transmitted from the client 400_2 in FIG. 16A will now be described.

Step, S400: The packet 700 (not shown) transmitted from the node device 100_21 in the west direction is transmitted to the client 400_1 through the node device 100_22, the redundant node device 100z_23, the redundant link 300z 1, the redundant node device 100z_13 and node devices 100_12 and 100_11.

Step S401: The packet 700 transmitted from the node device 100_21 in the east direction is transmitted to the redundant node device 100z_24 through the node devices 100_26 and 100_25, and is discarded as a result of the hash operation by the redundant node device 100z_24.

Hereinafter, the route of the packet from the client 400_2 to the client 400_1 in a case where the redundant node devices 100z_23 and 100z_13 are switched over to the protection system as shown in FIG. 16B will be described.

Step S410: The packet (not shown) transmitted from the node device 100_21 in the east direction is transmitted to the client 400_1 through the node devices 100_26 and 100_25, the redundant node device 100z_24, the redundant link 300z_2, the redundant node device 100z_14, the node devices 100_15, 100_16 and 100_11.

Step S411: The packet 700 transmitted from the node device 100_21 in the west direction is transmitted to the protection redundant node device 100z_23 through the node device 100_22, and is discarded by the redundant node device 100z_23.

Thus, when the number of node devices after the switchover is large, a transfer delay of the packet compared with a case where the number of the node devices is small occurs. For example, when the route is switched over as shown in FIG. 16B after the packet 700_1 transmitted in the west direction has passed through the redundant link 300z_1 in FIG. 16A, the packet 700_2 transmitted in the east direction occasionally has not yet reached the redundant node device 100z_24. In this case, the client 400_1 receives the same packets 700_1 and 700_2 redundantly from the former route and the new route.

In this embodiment (10), a timer is provided to each of the node devices 100 and 100z. When the source MAC address of the received RPR packet is the common address for the redundant node device, each of the node devices 100 and 100z checks the source ring route and the TTL value. When the TTL value of the packet having the same common address changes, each of the node devices 100 and 100z determines that the switchover of the redundant node device occurs, starts up the timer and discards the packet of the concerned common address until the time is up. Thus, by providing a protection time of the packet reception immediately after the switchover, the packet double reception in the redundant node device switchover can be prevented.

Also, in this operational embodiment (10), a timer is provided in each of the node devices 100 and 100z. The redundant node device detects that the working redundant node device 100z has been switched over to the protection state due to a fault occurrence or the like, and broadcasts over the ring the control packet including the common address of the redundant node device switched over. Each of the node devices having received the control packet starts up the timer of the node device itself, and discards the received packet whose source address is the common address indicated by the control packet until the time is up. Thus, the packet double reception and the reverse of the packet order after the redundant node device switchover can be prevented.

Furthermore, in this operational embodiment (10), a timer is provided in the redundant node device 100z. When detecting that the other working state redundant node device 100z is switched over to the protection state due to a fault occurrence or the like, the redundant node device starts up its own timer, and discards the received packet whose source address is the common address of the redundant node device where the state has changed, until the time is up. Thus, the packet double reception and the reverse of the packet order after the redundant node device switchover can be prevented.

Operational Embodiment (11)

FIGS. 17A and 17B show an operational embodiment (11) of the present invention. In this embodiment (11), a function of compulsorily switching over the state of the redundant node device 100z is newly provided. Upon testing, evaluating or network operation, it is made possible to compulsorily switch over the state of the redundant node device, that is, "working state ST11→protection state ST12" or "protection state ST12→working state ST11" by compulsorily entering the state switchover command from outside to e.g. controller 10.

FIG. 17A shows the state of the redundant node device 100z, which is the same as that shown in FIG. 5A.

FIG. 17B shows a state transition in the load balancing type. This state transition is different from that shown in FIG. 5B in that the transition conditions of the working state such as ST11 → protection state ST12 and the protection state ST12 → working state ST11 include further switchover conditions in addition to the basic conditions shown in FIG. 5B.

Namely, the transition condition of "working state ST11→protection state ST12" is to allow the transition to be done only upon the working state compulsory switchover release 810, and upon the fault detection of the node device itself 802 (basic condition) or the protection state compulsory switchover 807.

The transition condition of "protection state ST12→working state ST11" is to allow the transition to be done upon the working state compulsory switchover 808, or during the normal state of the node device itself 801 (basic condition) and upon the protection state compulsory switchover 807.

Thus, by entering the state switchover command 811 to the controller 10, it becomes possible to compulsorily switch over the state of the redundant node device, and to efficiently perform a test or an evaluation of the RPR node redundancy switchover or the like.

Operational Embodiment (12)

Figures 18A, 18B:
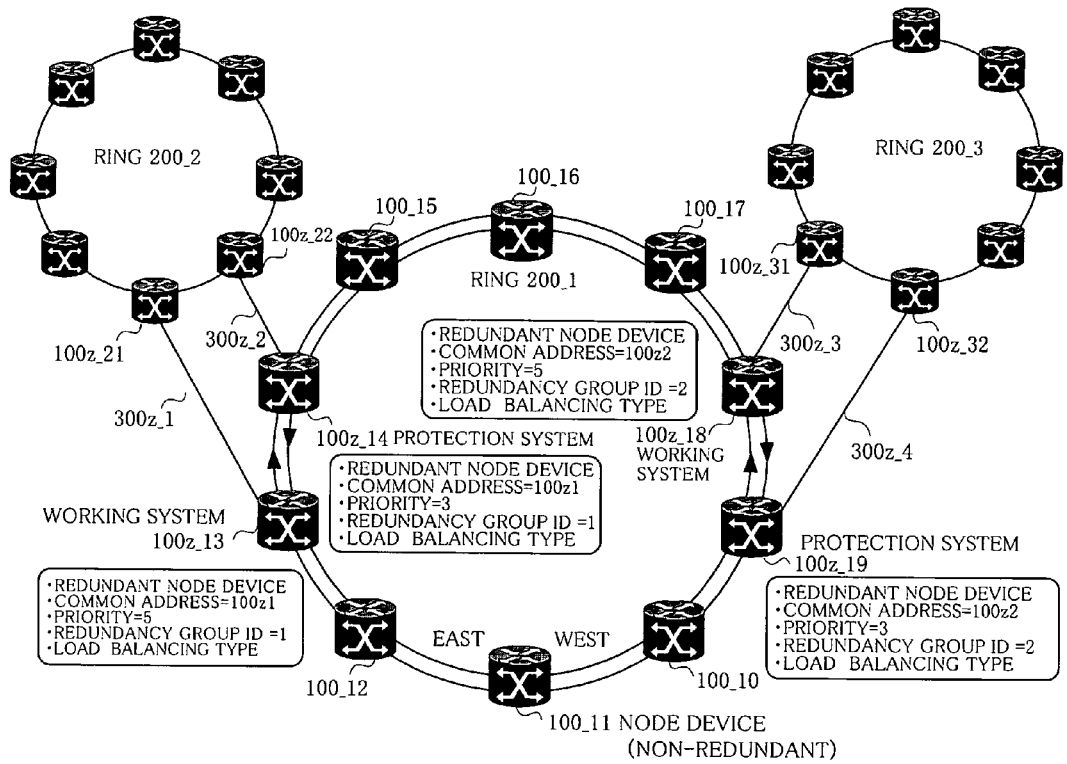
FIGS. 18A and 18B are diagrams showing an operational embodiment (12) of a node device according to the present invention.
Figure 19:
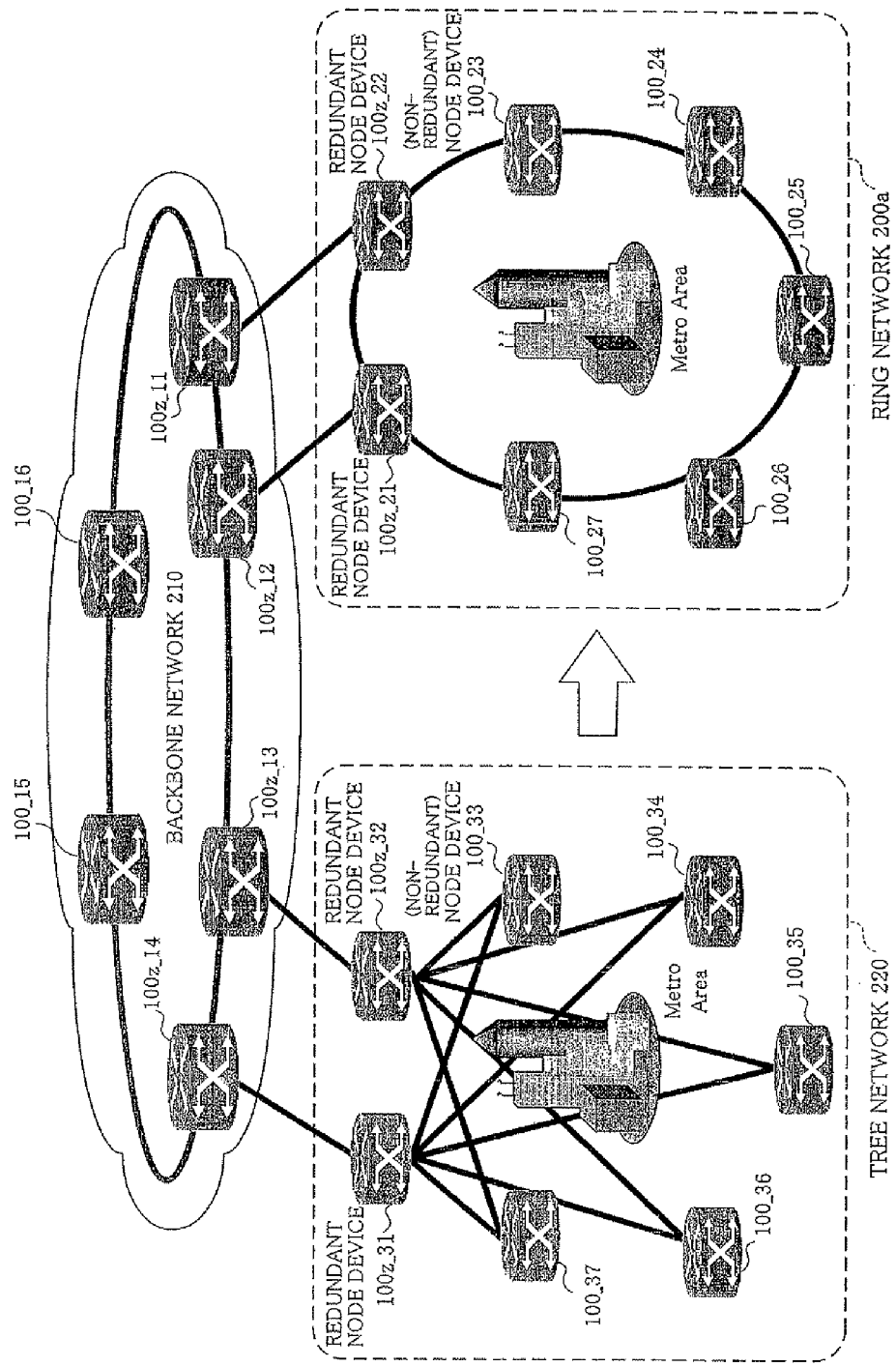
FIG. 19 is a block diagram showing a redundant configuration of a node device in a general network.

FIGS. 18A and 18B show an operational embodiment (12) of the present invention. This embodiment (12) enables an operator to grasp an "identification (group ID)", a "present state" or the like of the redundant node device 100z as required.

FIG. 18A shows a network example, which is the same as that of the embodiment (5) shown in FIG. 11A.

FIG. 18B shows a ring topology table 70z of the node device 100_11. This table 70z is different from the table 70x of the embodiment (5) shown in FIG. 11B in that a redundancy state 79 (hatched portion) is added. "Working", "protection", "working" and "protection" are respectively registered in the redundancy states 79 of the redundant node devices 100z_13, 100z_14, 100z_18 and 100z_19.

Each of the redundant node devices 100z transmits the keep alive message 700x in which the state of the node device itself is set to the redundancy state 785 (see FIG. 4). In each of the node devices 100 and 100z, the ring topology preparing portion 11 reflects the redundancy state 785 of the received keep alive message 700x in the redundancy state 79 of the table 70z.

Each of the node devices 100 and 100z has a topology table 70z reading function (not shown). It is made possible for an operator to grasp the "identifier (group ID)", the "present state" or the like of the redundant node device 100z by reading the ring topology table 70z, and to recognize an abnormal state by monitoring wrong settings of the redundant node device 100z, the state of the redundant node device 100z or the like.

Operational Embodiment (13)

Normally, in collecting statistical information of the received packets, there are some cases where statistics of the received packets are collected per packet transmission node device. In this case, the packet source node device is specified based on the source address 740 of the RPR packet 700. The packet of the present invention uses the common address as the source address of the redundant node device, so that the source redundant node device can not be specified.

In this embodiment (13), the source redundant node device of the received RPR packet is specified. As shown in FIG. 21, the RPR packet 700 has the fields of the TTL_BASE 750 and the TTL 710. The TTL_BASE 750 holds the "initial value of TTL", and the TTL 710 is decremented by 1 every time the packet passes through the node device. Therefore, the hop number from the source redundant node device to the node device itself="TTL_BASE"—"TTL" is obtained, thereby specifying the source node device based on the hop number and the ring topology table.

Thus, if the statistical information of the number of the received packets is complied and displayed per "common address and source node device", it becomes possible to recognize the number of received packets from the protection redundant node device which is not inherently to transmit the packets, thereby improving the monitoring function of the ring network where the redundant node devices are arranged.

Operational Embodiment (14)

In this embodiment (14), the packet distributor specifies the received packet whose source is a protection redundant node device 100z by using the display function of the redundancy state 785 of the ring topology table 70z shown in the operational embodiment (12) and the function of specifying the source redundant node device 100z of the received packet shown in the operational embodiment (13). The packet distributor discards the concerned packet after compiling the statistical information.

Thus, it becomes possible to discard the received packet whose source is the protection redundant node device by using the standard RPR packet format for the RPR packet (namely, without adding a field for distinguishing a source of "working redundant node device" from that of "protection redundant node device", and an address field of the source redundant node device).

While the protection redundant node device originally does not transmit a packet to the ring, there is a possibility of transmitting a packet upon fault occurrence. Also, there is a possibility that the redundant node device keeps on transmitting packets, although with a low frequency, after having transmitted from a working system (working state) to a protection system (protection state). In such a case, by compulsorily discarding the packet, the node device on the receiving side can further enhance the reliability of the ring network where the redundant node devices are arranged.

Operational Embodiment (15)

When an OAM packet or the like checking information on a route to a specific node device, or checking a normality of route is received in this embodiment (15), the redundant node device provides the individual address of the node device itself to the OAM packet. This will be described by referring to FIGS. 13A-13C.

When a command of a trace route or the like is issued from the client 400_1 to the client 400_2, the redundant node devices 100z_13 and 100z_23 respectively reply (provide) not the common addresses "100z1" and "100z2", but the individual addresses "100z_13" and "100z_23" to the packet corresponding to the command request. Thus, the redundant node devices 100z_13 and 100z_23 can return the specific route information.

Operational Embodiment (16)

In this embodiment (16), the packet distributor of the redundant node device determines a specific packet received by the node device itself among a plurality of working redundant node devices, regardless of the result of the hash operation. Generally, the packet distributor is provided with a function of referring attributes (address information, protocol identifying information or the like) of a packet, and a filtering function of determining whether or not a packet with a specific attribute is captured.

In the embodiment (16), the packet distributor uses a priority of the redundant node device as an exclusive control function for preventing a plurality of working redundant node devices from capturing the same packet. Namely, when a plurality of redundant node devices of the same redundancy group exist on a ring, the packet distributor receives the packet selected by the filtering result when e.g. the priority of the node device itself is the highest. Thus, it is made possible to prevent a plurality of redundant node devices from receiving and forwarding the same packet.

What is claimed is:

1. A network system comprising at least one non-redundant node device belonging to a first ring network, connected to a second ring network with a plurality of working redundant node devices belonging to the second ring network,
    wherein the non-redundant node device comprises:
        a topology table;
        a transmitter transmitting topology information of the non-redundant node device;
        a topology table preparing portion preparing the topology table based on the topology information of the non-redundant node device itself, the topology information received from the non-redundant node device, and the topology information and redundancy information received from each redundant node device; and
        a packet distributor distributing received packets over the first ring network based on the topology table; and
    wherein each redundant node device comprises:
        a topology table;
        a transmitter transmitting topology information and redundancy information of the redundant node device itself;
        a topology table preparing portion preparing the topology table based on the topology information and the redundancy information of the redundant node device itself, the topology information received from a non-redundant node device, and the topology information and the redundancy information received from each redundant node device; and
        a packet distributor distributing received packets over the second ring network based on the topology table.

2. The redundant node device as claimed in claim 1, further comprising a controller enabling an operation mode which makes only a specific redundant node device a working system to be selected in addition to a mode in which the working redundant node devices operate, based on the redundancy information.

3. The redundant node device as claimed in claim 1, wherein the packet distributor determines, when the redundant node device itself is a working system, a forwarding packet based on a number of working redundant node devices, a destination address of a packet indicated in the topology table and a preset calculation.

4. The non-redundant node device as claimed in claim 1, wherein the packet distributor recognizes a number of node devices over the first ring network networks based on the topology table, stores a value equal to or more than the number of node devices in a time to live of a packet addressed to the redundant node device and when a source address of a received packet is the same as an address of the node device itself, deletes the packet.

5. The non-redundant node device as claimed in claim 1, wherein the packet distributor recognizes a number of node devices over the first ring network based on the topology table, and stores the number of node devices in a time to live of a packet addressed to the redundant node device to be distributed.

6. The non-redundant node device as claimed in claim 1, wherein the packet distributor obtains a number of hops to a redundant node device at a farthest end from the node device itself as a starting point in an east ring or a west ring based on the topology table, stores the number of hops in a time to live of a packet addressed to a redundant node device and transmits a packet to a ring side indicating the farthest end.

7. A non-redundant node device composing a ring network connected to another network with a plurality of working redundant node devices comprising:
    a topology table;
    a transmitter transmitting topology information of the non-redundant node device itself;
    a topology table preparing portion preparing the topology table based on the topology information of the non-redundant node device itself, topology information received from a non-redundant node device, and topology information and redundancy information received from the non-redundant node device; and
    a packet distributor distributing received packets over the ring network based on the topology table, wherein
    the packet distributor obtains a number of hops to each redundant node device from the node device itself as a starting point in an east ring and a west ring respectively based on the topology table, determines a redundant node device which distributes a packet from the east ring or the west ring so that an available bandwidth on each ring becomes optimum based on the number of hops, obtains the number of hops to a redundant node device at a farthest end within the redundant node devices and transmits a packet which stores the number of hops in a time to live to an east ring side or a west ring side.

8. The non-redundant node device as claimed in claim 1, wherein the topology table registers a common address of the redundant node devices and the packet distributor transmits a packet addressed to the redundant node devices using the common address.

9. The node device as claimed in claim 8, wherein the topology table preparing portion registers different common addresses corresponding to networks respectively in the topology table and the packet distributor transmits a packet addressed to the redundant node devices using the common addresses.

10. The node device as claimed in claim 9, wherein the topology table preparing portion registers the different common addresses for the networks associated with the redundant node device to be registered.

11. The non-redundant node device as claimed in claim 1, wherein the redundancy information includes redundancy group information.

12. The redundant node device as claimed in claim 1, wherein the packet distributor registers source address information of a packet in a transmission management table of the redundant node device itself regardless of an operation state of the redundant node device itself, and distributes packets after a switchover of a redundant node device by referring to the registered information.

13. The redundant node device as claimed in claim 1, wherein the packet distributor synchronizes a transmission management table of the redundant node device itself with a transmission management table of another redundant node device of a same redundancy group.

14. The non-redundant node device as claimed in claim 1, wherein the packet distributor discards packets received from the redundant node device from a time when a reception ring or a time to live of a packet received from another redundant node device changes until a preset time elapses.

15. The non-redundant node device as claimed in claim 1, wherein the packet distributor broadcasts a packet indicating an occurrence of a switchover of the redundant node device when a change of a reception ring or a time to live of a packet received from another redundant node device is detected, and discards packets received from the redundant node device from a time when the broadcast packet is received from another node device until a preset time elapses.

16. The redundant node device as claimed in claim 1, wherein the packet distributor does not transmit a received packet from another redundant node device from a time when a state change of another redundant node device is detected until a preset time elapses.

17. The redundant node device as claimed in claim 1, further comprising a controller switching over a redundant state of the redundant node device itself, based on a state switchover command designating a redundant state.

18. The redundant node device as claimed in claim 1, wherein the redundancy information includes a redundant state of a redundant node device having transmitted the redundancy information, and the topology table preparing portion having received the redundant state registers the redundant state of the redundant node device in the topology table.

19. The non-redundant node device as claimed in claim 1, wherein the first ring network comprises a Resilient Packet Ring (RPR) ring network, and the transmitter and the packet distributor correspond to an RPR.

20. The node device as claimed in claim 19, wherein the packet distributor specifies a source redundant node device of a packet by using a set value of a TTL_BASE and a TTL field of an RPR packet received.

21. The non-redundant node device as claimed in claim 1, wherein the packet distributor discards a received packet whose source is a protection redundant node device, and displays an alarm indicating reception of the packet.

22. The redundant node device as claimed in claim 1, wherein the packet distributor provides an individual address of the redundant node device itself to a source address of an Operation Administration and Maintenance (OAM) packet.

23. The redundant node device as claimed in claim 1, wherein the packet distributor determines whether or not a received packet is forwarded based on attribute information of the received packet and a priority of the redundant node device itself.

24. The redundant node device as claimed in claim 19, wherein the transmitter stores the redundancy information in a control packet of an RPR packet in a form of a Type Length Value (TLV) to be broadcast over the ring network.

25. The redundant node device as claimed in claim 1, wherein the packet distributor recognizes a number of node devices over the second ring network based on the topology table, stores a value equal to or more than the number of node devices in a time to live of a packet addressed to the redundant node device and when a source address of a received packet is the same as an address of the node device itself, deletes the packet.

26. The redundant node device as claimed in claim 1, wherein the packet distributor recognizes a number of node devices over the second ring network based on the topology table, and stores the number of node devices in a time to live of a packet addressed to the redundant node device to be distributed.

27. The redundant node device as claimed in claim 1, wherein the packet distributor obtains a number of hops to a redundant node device at a farthest end from the node device itself as a starting point in an east ring or a west ring based on the topology table, stores the number of hops in a time to live of a packet addressed to a redundant node device and transmits a packet to a ring side indicating the farthest end.

28. A redundant node device composing a ring network and connected to another network comprising:
a topology table;
a transmitter transmitting topology information and redundancy information of the redundant node device itself;
a topology table preparing portion preparing the topology table based on the topology information and the redundancy information of the redundant node device itself, topology information received from a non-redundant node device, and topology information and redundancy information received from a redundant node device; and
a packet distributor distributing received packets over the ring network based on the topology table, wherein
the packet distributor obtains a number of hops to each redundant node device from the node device itself as a starting point in an east ring and a west ring respectively based on the topology table, determines a redundant node device which distributes a packet from the east ring or the west ring so that an available bandwidth on each ring becomes optimum based on the number of hops, obtains the number of hops to a redundant node device at a farthest end within the redundant node devices and transmits a packet which stores the number of hops in a time to live to an east ring side or a west ring side.

29. The redundant node device as claimed in claim 1, wherein the topology table registers a common address of the redundant node devices and the packet distributor transmits a packet addressed to the redundant node devices using the common address.

30. The redundant node device as claimed in claim 1, wherein the redundancy information includes redundancy group information.

31. The redundant node device as claimed in claim 1, wherein the packet distributor discards packets received from the redundant node device from a time when a reception ring or a time to live of a packet received from another redundant node device changes until a preset time elapses.

32. The redundant node device as claimed in claim 1, wherein the packet distributor broadcasts a packet indicating an occurrence of a switchover of the redundant node device when a change of a reception ring or a time to live of a packet received from another redundant node device is detected, and discards packets received from the redundant node device from a time when the broadcast packet is received from another node device until a preset time elapses.

33. The redundant node device as claimed in claim 1, wherein the redundancy information includes a redundant state of a redundant node device having transmitted the redundancy information, and the topology table preparing portion having received the redundant state registers the redundant state of the redundant node device in the topology table.

34. The redundant node device as claimed in claim 1, wherein the second ring network comprises a Resilient Packet Ring (RPR) network, and the transmitter and the packet distributor correspond to an RPR.

35. The redundant node device as claimed in claim 1, wherein the packet distributor discards a received packet whose source is a protection redundant node device, and displays an alarm indicating reception of the packet.

* * * * *

UNITED STATES PATENT AND TRADEMARK OFFICE
CERTIFICATE OF CORRECTION

PATENT NO. : 7,619,987 B2
APPLICATION NO. : 11/045063
DATED : November 17, 2009
INVENTOR(S) : Yasuyuki Mitsumori It is certified that error appears in the above-identified patent and that said Letters Patent is hereby corrected as shown below:

Column 29, Line 37, change "device;" to --device itself;--.

Signed and Sealed this

Twenty-sixth Day of January, 2010

David J. Kappos
*Director of the United States Patent and Trademark Office*